(12) United States Patent
Berg et al.

(10) Patent No.: US 11,194,456 B1
(45) Date of Patent: *Dec. 7, 2021

(54) WEBPAGE TESTING TOOL

(71) Applicant: Allstate Insurance Company, Northbrook, IL (US)

(72) Inventors: John Michael Berg, Grayslake, IL (US); Jeraldine Dahlman, Evanston, IL (US); Jason T. Fong, Hoffman Estates, IL (US); Sameer Khaladkar, Buffalo Grove, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,147

(22) Filed: Mar. 24, 2021

Related U.S. Application Data

(63) Continuation of application No. 15/709,827, filed on Sep. 20, 2017, now Pat. No. 10,963,138, which is a
(Continued)

(51) Int. Cl.
*G06F 3/0481* (2013.01)
*G06F 3/0484* (2013.01)

(52) U.S. Cl.
CPC ........ *G06F 3/04842* (2013.01); *G06F 3/0481* (2013.01)

(58) Field of Classification Search
CPC ........................... G06F 3/04842; G06F 3/0481
(Continued)

(56) References Cited

U.S. PATENT DOCUMENTS 5,845,302 A  12/1998  Cyman, Jr. et al.
7,028,223 B1  4/2006  Kolawa et al.
(Continued)

FOREIGN PATENT DOCUMENTS

CN  102902619 A  1/2013

OTHER PUBLICATIONS

"Regression Testing With JMeter," http://www.devarticles.eom/c/a/PHP/Regression-Testing-With-JMeter/, 4 pages.
(Continued)

*Primary Examiner* — Andrew R Dyer
(74) *Attorney, Agent, or Firm* — Dinsmore & Shohl LLP

(57) ABSTRACT

Methods, computer-readable media, software, and apparatuses provide a system for implementing a tool that allows users to test a webpage. The system may include a computing device configured to use the tool to parse a request that is transmitted in response to, for example, a selection to load the webpage. The tool may also generate a user interface comprising variables of the request. The variables may be displayed so that they may be selected by a user. For each selected variable, the computing device may generate a column within a table. The table may include the values for each selected variable. The computing device may also generate a second table with corresponding values for corresponding variables. Further, the computing device may compare corresponding values to execute regression testing. Also, the computing device may allow a user to select criteria for certain variables to generate rules and apply rules against requests. The computing device may also allow users to export data to be analyzed and reported in another tool.

17 Claims, 9 Drawing Sheets

Related U.S. Application Data continuation of application No. 14/338,006, filed on Jul. 22, 2014, now Pat. No. 9,811,248.

(58) Field of Classification Search
USPC .......................................................... 715/234
See application file for complete search history.

(56) References Cited

U.S. PATENT DOCUMENTS

| | | | |
|---|---|---|---|
| 7,047,277 | B1 | 5/2006 | Welter et al. |
| 7,194,535 | B2 | 3/2007 | Hannel et al. |
| 7,219,346 | B2 | 5/2007 | Patiejunas |
| 7,412,442 | B1 | 8/2008 | Vadon et al. |
| 7,664,990 | B2 | 2/2010 | Kodaka et al. |
| 7,792,963 | B2 | 9/2010 | Gould et al. |
| 8,090,800 | B2 | 1/2012 | Yee |
| 8,103,599 | B2 | 1/2012 | Gao et al. |
| 8,117,591 | B1 | 2/2012 | Michelsen |
| 8,230,267 | B2 | 7/2012 | Noller et al. |
| 8,429,614 | B2 | 4/2013 | Zhang et al. |
| 8,448,131 | B2 | 5/2013 | Ottavi et al. |
| 8,539,282 | B1 | 9/2013 | Kabanov et al. |
| 8,543,379 | B1 | 9/2013 | Michelsen |
| 8,627,442 | B2 | 1/2014 | Ji et al. |
| 8,732,008 | B2 | 5/2014 | Jain et al. |
| 2003/0051042 | A1 | 3/2003 | Tazoe |
| 2004/0098493 | A1 | 5/2004 | Rees |
| 2005/0280862 | A1 | 12/2005 | Fukushima |
| 2006/0195780 | A1 | 8/2006 | Zuccolotto et al. |
| 2008/0140646 | A1 | 6/2008 | Inoue et al. |
| 2008/0227064 | A1 | 9/2008 | Yoon |
| 2008/0270841 | A1 | 10/2008 | Quilter |
| 2009/0182718 | A1 | 7/2009 | Waclawik et al. |
| 2010/0058366 | A1 | 3/2010 | Swildens |
| 2010/0299438 | A1 | 11/2010 | Zimmerman et al. |
| 2010/0306028 | A1 | 12/2010 | Wagner |
| 2011/0191303 | A1 | 8/2011 | Kaufman et al. |
| 2012/0089700 | A1 | 4/2012 | Safruti et al. |
| 2012/0246312 | A1 | 9/2012 | Exton et al. |
| 2013/0227078 | A1 | 8/2013 | Wei et al. |
| 2013/0275606 | A1 | 10/2013 | Iyer |
| 2014/0109050 | A1 | 4/2014 | Gibbens |
| 2014/0109051 | A1 | 4/2014 | Mcdonald et al. |
| 2014/0109052 | A1 | 4/2014 | Tempel et al. |
| 2014/0109055 | A1 | 4/2014 | Gibbens et al. |
| 2014/0109056 | A1 | 4/2014 | Schissel et al. |
| 2014/0109057 | A1 | 4/2014 | Gibbens et al. |
| 2014/0109058 | A1 | 4/2014 | Tempel et al. |
| 2014/0109061 | A1 | 4/2014 | Gibbens et al. |
| 2014/0109063 | A1 | 4/2014 | Schissel et al. |
| 2014/0180969 | A1 | 6/2014 | Hettenkofer et al. |
| 2014/0189435 | A1 | 7/2014 | Manuel-Devadoss et al. |
| 2015/0033078 | A1 | 1/2015 | Wintergerst et al. |
| 2015/0150023 | A1 | 5/2015 | Johnson et al. |

OTHER PUBLICATIONS

"Selenium—Web Browser Automation,"—http://docs.seleniumhq.org/, 2 pages.

"VTest Functional Testing Tools,"—http://www.verisium-com/products/vTest/index.html, 2 pages.

"Web Testing—iMacros," http://wiki.imacros.net/Web Testing#Regression Testing, 13 pages.

Swarnendu Biswas et al. "Regression Test Selection Techniques: A Survey," http://www.cse.ohio-state.edu/~biswass/files/papers/informaticasurvey.pdf, 34 pages, Jul. 22, 2021.

"WinRunner 7.0,"—Mercury Interactive Corporation http://students.depaul.edu/~slouie/wrtut.pdf, 193 pages.

Animesh Chaturvedi et al. "A Tool Supported Approach to Perform Efficient Regression Testing of Web Services" http://www.sei.cmu.edu/community/mesoca2013/upload/Chaturvedi-MESOCA-2013.pdf, pp. 1-19.

"Krypton," Krypton Regression Automation Framework http://thinksys.com/krypton/krypton.html, website visited Jul. 22, 2017, 4 pages.

"GitHub," https://github.com/jkbr/httpie, 19 pages Dec. 3, 2014.

"Automated Regression Testing of Web Applications," Project Report by Nadia Alshahwan, Sep. 2, 2005, School of Physical Sciences and Engineering, MSc in Advanced Software Engineering 2005, 68 pages.

Azzam, S. Al-Kabi, M.N., and Alsmadi, I., "Web Services Testing Challenges And Approaches," ICCIP 2012, pp. 291-296.

"Using Bloodhound to Test Mobile Applications" Marketing Cloud Help—Adobe Systems Incorporated, http://microsite.omniture.com/t2/help/en_US/sc/appmeasurement/qa/index.html, website visited Jun. 11, 2014, pp. 1-2.

Mehdi Khalili; "Fiddler In Action—Part 1" Apr. 25, 2012; mehdi-khalili.com; pp. 1-20.

Mehdi Khalili "Fiddler In Action—Part 2" Apr. 25, 2012; mehdi-khalili.com; pp. 1-23.

"User Interface Guide;" Fiddler Documentation, Web Debugging Proxy; Jan. 30, 2014; Telerik.com; pp. 1-3.

Oct. 4, 2016—U.S. Office Action—U.S. Appl. No. 14/338,006 pp. 1-31.

Feb. 27, 2017—U.S. Office Action—U.S. Appl. No. 14/338,006 pp. 1-31.

Jun. 20, 2017—U.S. Notice of Allowance—U.S. Appl. No. 14/338,006 pp. 1-28.

HttpWatch—Features; HttpWatch.com; Jan. 6, 2014; pp. 1-12.

"Using Fiddler QuickExec Feature", Eric Lawrence; Mar. 12, 2013; https://www.youtube.com/watch?v=gq25ltSnq84&app=desktop; pp. 1-16.

Oct. 18, 2018—U.S. Non-Final Office Action—U.S. Appl. No. 15/709,827 pp. 1-26.

Feb. 21, 2019—U.S. Final Office Action—U.S. Appl. No. 15/709,827 pp. 1-26.

Jul. 18, 2019—U.S. Non-Final Office Action—U.S. Appl. No. 15/709,827 pp. 1-21.

Nov. 5, 2019—U.S. Final Office Action—U.S. Appl. No. 15/709,827 pp. 1-23.

Apr. 10, 2020—U.S. Non-Final Office Action—U.S. Appl. No. 15/709,827 pp. 1-18.

Jul. 28, 2020—U.S. Final Office Action—U.S. Appl. No. 15/709,827 pp. 1-20.

Nov. 20, 2020—U.S. Notice of Allowance—U.S. Appl. No. 15/709,827 pp. 1-8.

WEBPAGE TESTING TOOL

CROSS-REFERENCE TO RELATED APPLICATIONS

This application is a continuation of U.S. patent application Ser. No. 15/709,827 filed Sep. 20, 2017 which is a continuation of and claims priority to U.S. application Ser. No. 14/338,006, filed Jul. 22, 2014, issued as U.S. Pat. No. 9,811,248 on Nov. 7, 2017 and entitled "WEBPAGE TESTING TOOL" and which is hereby incorporated by reference herein in its entirety.

FIELD OF ART

Aspects of the disclosure generally relate to methods and computer systems, including one or more computers particularly configured and/or executing computer software. More particularly, aspects of this disclosure relate to a tool for testing one or more webpages and/or mobile applications.

BACKGROUND

A webpage is a page or document accessible via the Internet using a web browser. Webpages may include various elements that, when interpreted by a web browser, cause the web browser to display text, images, video, etc. Webpages are typically written using the HyperText Markup Language (HTML) and/or another type of markup language, such as the Extensible Markup Language (XML). A single webpage may contain hundreds or thousands (or more) of lines of code. Given the complexity of some webpages and the enormous amount of code, it is not uncommon for web developers to make errors or build in inefficiencies when writing code for a webpage. Some errors may cause the webpage to function incorrectly or not function at all, while some inefficiencies may detract from the webpage's performance (e.g., slowdown the load time of the webpage). Finding these errors and inefficiencies may be difficult given the large amount of code. Moreover, this problem is exacerbated by the fact that there are often multiple webpages in a single website and that many websites undergo somewhat frequent changes. Further, the nature of programming is such that making one change to fix one issue can cause another issue to arise.

To ensure webpages will work properly and efficiently, people may be hired to test webpages. Indeed, some companies employ people to test their webpages, particularly when they expect to make somewhat frequent changes. These testers are given the task of accessing and interacting with webpages to see how they respond to certain test inputs and to identify "bugs" in the webpage. In some cases, testers use software tools for capturing the HyperText Transfer Protocol (HTTP) requests. Such HTTP requests may include numerous variables and values thereof as well as other values of headers, cookies, and query strings. The testers must review the HTTP requests line-by-line to identify problematic values. Because it is difficult to spot problematic values, some testers compare HTTP requests of a version of a webpage that they know works (or is acceptable) with HTTP requests of a version of the webpage that they are testing. This testing by comparison may be referred to as regression testing. Still, when performing regression testing, the testers must go back-and-forth between the requests and compare them line-by-line. As such, testing may be a tedious task that is prone to human errors and slows down the development and evolution of webpages.

The above described testing is mostly performed prior to publishing the webpage online or soon thereafter. After a webpage has been tested and is made accessible to the public, the webpage's performance may be monitored. Monitoring may include using software to collect network traffic and eyeballing the network traffic to identify concerns. HTTPWATCH and FIDDLER are two such tools for collecting and monitoring webpage traffic. Additionally, monitoring may include analyzing web analytics that are captured by cookies or other tags inserted into the webpage to collect web analytics as visitors access and interact with the webpage. While monitoring a webpage may be useful from a marketing standpoint, it is often preferable to discover and remedy problems with a webpage before it becomes publicly available.

Accordingly, new systems, devices, methodologies, and software are desired to simplify analysis and verification of new and/or updated webpages to improve the accuracy of testing webpages and/or reduce the amount of time used for testing webpages.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, computer readable storage media, software, systems, and apparatuses for testing whether new and updated webpages are working properly. Aspects of the disclosure provide a tool for simplifying the analysis and verification of properties of webpages so that testing may be performed accurately and relatively quickly. For example, the tool may be used to verify that a particular variable has a particular value when an HTTP request (in which one or more variables and their parameters are passed as parameters) is made. The tool may be implemented as a standalone software program/application or a web-based program/application. The tool may provide a user interface for testers to use when testing a new or updated webpage. The tool may be used to parse an HTTP request generated when testing the webpage. The tool may parse multiple HTTP requests at the same time or in response to a single command. Upon parsing the request(s), the tool may sort out variables of the request and organize them in a table. The tool may allow the tester to choose which variables to evaluate. The tool may also generate a table with the values of each of the variables in each of the HTTP requests. As a user selects different variables to evaluate, the table may automatically update to reflect the values of only the selected variables.

Further, the tool may provide automatic regression testing. That is, the tool may compare a value for a variable of a previously verified HTTP request (also referred to herein as a standard or control request) with a value of a variable of a test HTTP request. The tool may automatically determine whether the values of corresponding variables match and output a pass or fail indicator accordingly. In the event of a failure, the tool may indicate which variable(s) caused the respective HTTP request to fail to meet a desired result. The tool may compare values for multiple pairs of variables at the same time or in response to a single command. Also, the tool may form two tables of variables side-by-side: one for the standard HTTP request and one for the test HTTP request. As a tester scrolls in one table, the tool may automatically scroll the other table so that the views of both tables are similar. Additionally, the tool may provide the ability to choose the order of the variables and freeze the scrolling in one table to continually view a set of variables while scrolling another table view other variables.

In addition, the tool allows for generation of a test. A test may include one or more rules. Each rule may specify a variable to be tested and at least one parameter as criteria for testing the variable. For example, a rule may be established to check whether a value of a variable in the test HTTP request matches a particular value set by the tester. In another example, a rule may be established to check whether a variable fires (e.g., whether a variable has a value other than null or is not empty). In yet another example, a rule may be established to check that a variable does not fire (e.g., that the variable has a null value or is empty). The tool may save generated tests, including its rules, for use in testing other HTTP requests for other webpages or future versions of the same webpage. Also, the tool may allow testers to indicate the status of the test as well as provide comments. Moreover, the tool provides the ability to import and export saved tests for collaboration between multiple testers and for documentation of testing results.

Aspects of this disclosure provide a system comprising a first computing device (e.g., server) configured to provide a webpage and a second computing device in communication with the first computing device. The second computing device may transmit a request (e.g., HTTP request or HTTPS request) to the first computing device in response to a selection to load the webpage or a selection of an element on the webpage. The second computing device may be configured to implement or employ a testing tool for testing the webpage. The second computing device may be configured to parse the request to identify one or more variables of the request, display a user interface comprising a list of the one or more variables, and generate a table for display within the user interface. The table may include a column for each of the one or more variables that is selected.

The computing device may also be configured to automatically perform regression testing. For example, the computing device may be configured to parse a gold standard request so that values of the request and values of the gold standard request may be compared. Based on the results of the comparison, the computing device may output a pass or fail result for the request.

Further, the computing device may be configured to carry out rule-based testing. For example, the computing device may be configured to generate a rule for testing the request by setting criteria for at least one variable of the one or more variables. Examples of the criteria may include a requirement that a variable matches a particular value, a requirement that a variable has a value (e.g., that a variable fired), or a requirement that a variable does not have a value (e.g., that a variable did not fire).

Aspects of the disclosure also provide the computing devices of the system as well as the computer readable media of those computing devices that store a program for implementing the testing tool. Specifically, aspects of the disclosure provide a computing device, comprising a display, an input device, a network interface configured to communicate via a network (e.g., the Internet), and at least one processor. The input device may be configured to detect a first selection to load a webpage or a second selection of an element on the webpage. The network interface may be configured to transmit, to a web server, a first request in response to the first selection or the second selection. The at least one processor may be configured to parse the first request to identify one or more variables of the first request and display a user interface on the display. The user interface may comprise a list of the one or more variables. The at least one processor may also be configured to generate a table for display within the user interface. The table comprising a column or row for each of the one or more variables that is selected.

Aspects of the disclosure further provide a method of testing a webpage. The method may include capturing one or more requests transmitted in response to a first selection to load a webpage or a second selection of an element on a webpage and pasting the one or more requests into a user interface. Further, the method may include parsing the one or more requests to identify one or more variables of the one or more requests and displaying the identified one or more variables within the user interface such that at least a subset of the identified one or more variables are selectable. In response to selection of at least one variable of the displayed one or more variables, a column may be generated in a table within the user interface to hold a first value of the at least one variable selected. The method may further include determining the first value of the at least one variable; and displaying the first value of the at least one variable in the column.

In response to the selection of the at least one variable of the displayed one or more variables, another column may be generated in a second table within the user interface to hold a second value of the at least one variable selected. The method may further include determining the second value of the at least one variable and displaying the second value of the at least one variable in the another column in the second table. In addition, the method may include comparing the first value with the second value, and indicating a pass result if the first value matches the second value or a fail result if the first value is different from the second value based on the comparing.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed that provide a tool for testing one or more webpages. The tool provides a user interface that may assist testers in verifying that webpages are functioning as desired and help testers analyze HTTP requests to identify bugs when webpages are not functioning as desired. The tool may simplify such verification and analysis by automatically parsing HTTP requests, generating tables, and populating the tables with values of variables from the HTTP requests. The tool also allows testers to select certain variables to evaluate and automatically updates the tables in accordance with the selections. As such, the tool provides the ability to reduce the amount of data displayed to the tester so that the tester can focus on data of interest.

Further, the tool may automate regression testing. The tool may compare a test HTTP request against a standard HTTP request and output a result indicating whether the test HTTP request passes or fails. The tool has the ability to process a series of HTTP requests at approximately the same time, so that it may provide a pass or fail result for each request at approximately the same time.

In addition, the tool allows testers to generate a test and one or more rules thereof (e.g., by setting parameters for rules) and apply the test to HTTP requests. The tool may automatically analyze the HTTP request to determine whether it passes the one or more rules (e.g., meets one or more parameters) of the test, and may output a result indicating whether the test has passed or failed. The tool also allows testers to save the tests and/or rules they generate for later use in testing other HTTP requests for other webpages or other versions of the same webpage.

In particular, the disclosure focuses on the testing of HTTP requests. However, it should be understood that aspects of the disclosure may also be applied to HyperText Transfer Protocol Secure (HTTPS) requests. In other words, features of the testing tool 101 that are applicable to HTTP requests may also be applicable to HTTPS requests although HTTPS requests might not be specifically mentioned throughout the disclosure. Similarly, aspects of the present disclosure may also be applicable to other communication protocols used to communicate over a network, including any possible future versions of, or replacements for, HTTP.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Figure 1:
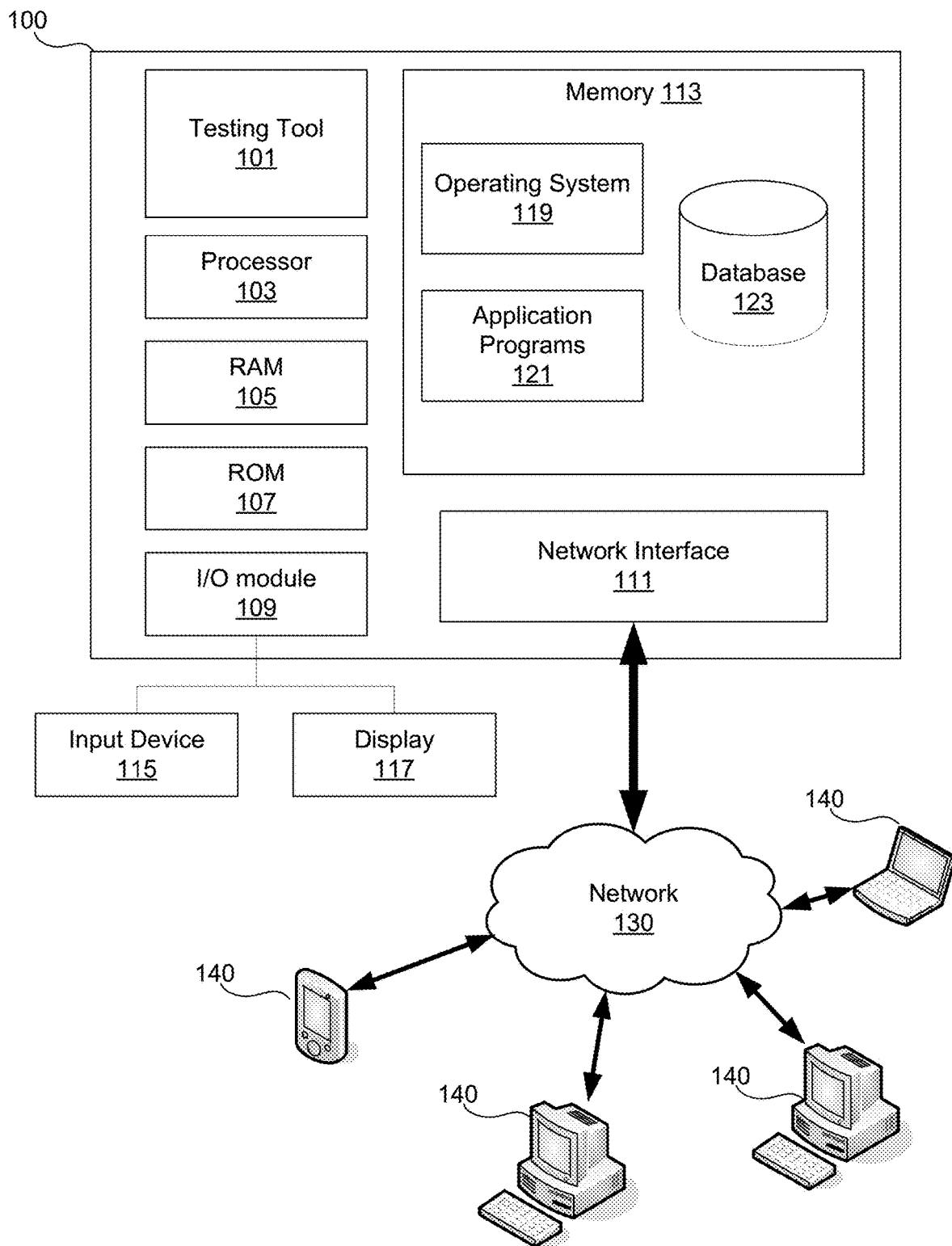
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, laptop computer, notebook, tablet, smartphone, etc. The computing device 100 may have a testing tool 101 configured to perform methods and execute instructions to test webpages as described herein. The testing tool 101 may be implemented with one or more specially configured processors and one or more storage units (e.g., databases, RAM, ROM, and other computer-readable media), one or more application specific integrated circuits (ASICs), and/or other hardware components. Throughout this disclosure, the testing tool 101 may refer to the software (e.g., a computer program or application) and/or hardware used to perform testing. The one or more specially configured processors of the testing tool 101 may operate in addition to or in conjunction with another general processor 103 of the computing device 100. In some embodiments, the testing tool 101 may be a software module executed by one or more general processors 103. Both the testing tool 101 and the processor 103 may be capable of controlling operations of the computing device 100 and its associated components, including RAM 105, ROM 107, an input/output (I/O) module 109, a network interface 111, and memory 113.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100, however, they may be within the same structure. Using the input device 115, testers may manipulate the testing tool 101 to perform a specific test for a specific webpage. The input device 115 may also be used to make selections, such as which variables to test or compare, or to generate rules for a test. Further, the input device 115 may be used to generate and capture HTTP requests. Meanwhile, the display device 117 may assist the testers and other users to confirm/appreciate their inputs and view results of the tests.

The memory 113 may be any computer readable medium for storing computer executable instructions (e.g., software). The instructions stored within memory 113 may enable the computing device 100 to perform various functions. For example, memory 113 may store software used by the computing device 100, such as an operating system 119 and application programs 121, and may include an associated database 123.

The network interface 111 allows the computing device 100 to connect to and communicate with a network 130. The network 130 may be any type of network, including a local area network (LAN) and/or a wide area network (WAN), such as the Internet, a cellular network, or satellite network. Through the network 130, the computing device 100 may communicate with one or more other computing devices 140, such as laptops, notebooks, smartphones, personal computers, servers, etc. The computing devices 140 may also be configured in a similar manner as computing device 100. In some embodiments, the computing device 100 may be connected to the computing devices 140 to form a "cloud" computing environment.

The network interface 111 may connect to the network 130 via communication lines, such as coaxial cable, fiber optic cable, etc. or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

FIG. 1 is an example embodiment of a computing device 100. In other embodiments, the computing device 100 may include fewer or more elements. For example, the computing device 100 might not include the general processor 103 in addition to one or more processors of the testing tool 101. On the other hand, the computing device 100 may be a mobile device (e.g., a smartphone, tablet, etc.), and thus, may also include various other components, such as a battery, speaker, and/or antennas (not shown).

Figure 2:
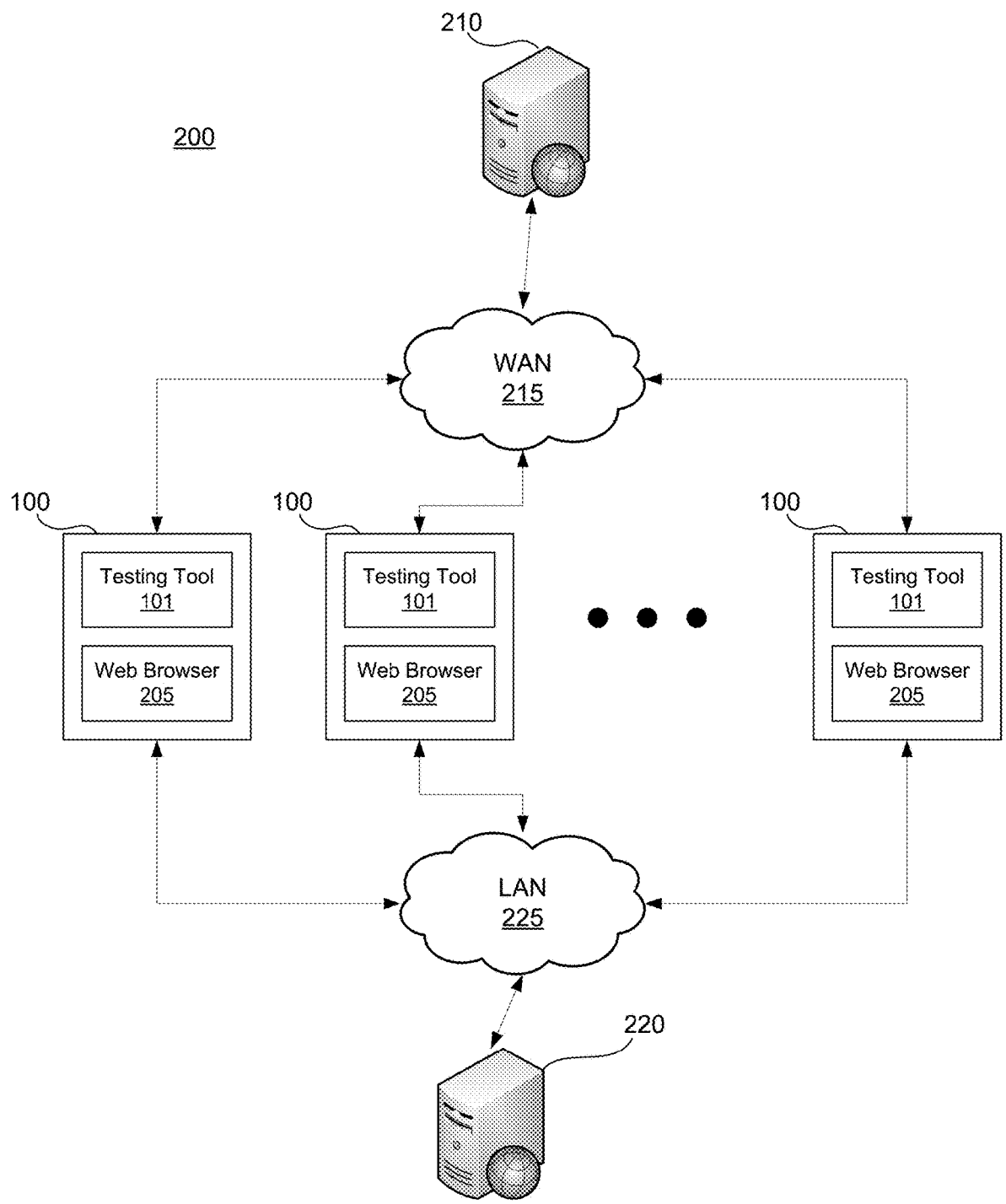
FIG. 2 illustrates an example system or network environment in which tools in accordance with the present disclosure may be implemented.

The testing tool 101 disclosed herein may be useful to more than one person (e.g., a tester) involved in testing a webpage. Therefore, the testing tool 101 may be configured for operation by a number of users. FIG. 2 illustrates an example system 200 for implementing methods according to the present disclosure. As shown in FIG. 2, the system may include multiple computing devices 100 connected to a web server 210 via a wide area network 215, such as the Internet. The web server 210 may be configured to host one or more websites. In particular, the web server 210 of FIG. 2 may store a website including a webpage to be tested. Any one of the computing devices 100 may execute a web browser 205 (e.g., INTERNET EXPLORER, FIREFOX, SAFARI, etc.) to access a webpage on the web server 210. Although FIG. 2 illustrates the web browser 205 as being separate from the testing tool 101, these applications may be combined (e.g., the testing tool 101 may be implemented as a plug-in to the web browser 205).

The multiple computing devices 100 may be used by multiple testers to access the same webpage at the same time. Each computing device 100 may be configured with the testing tool 100 so that multiple testers may simultaneously test the same webpage or different webpages of the same website. For example, two different testers may use two of the computing devices 100, respectively, to access the same webpage to capture the same or different HTTP requests. The two testers may then use the testing tool 101 on their respective computing device 100 to analyze the HTTP requests simultaneously. Although the system 200 of FIG. 2 illustrates three computing devices 100, more or fewer computing devices 100 may be included.

FIG. 2 also shows that the multiple computing devices 100 may be connected to a local network server 220 via a local area network 225, such as a company's internal network. The local network server 220 may store previously captured HTTP requests, including a "gold standard" or "control" request used for regression testing. The local network server 220 may also store past tests and rules thereof as well as past test results and reports. Each of the computing devices 100 may have access to the data stored on the local network server 220 so that each tester may use the data for their respective tests.

Figure 3:
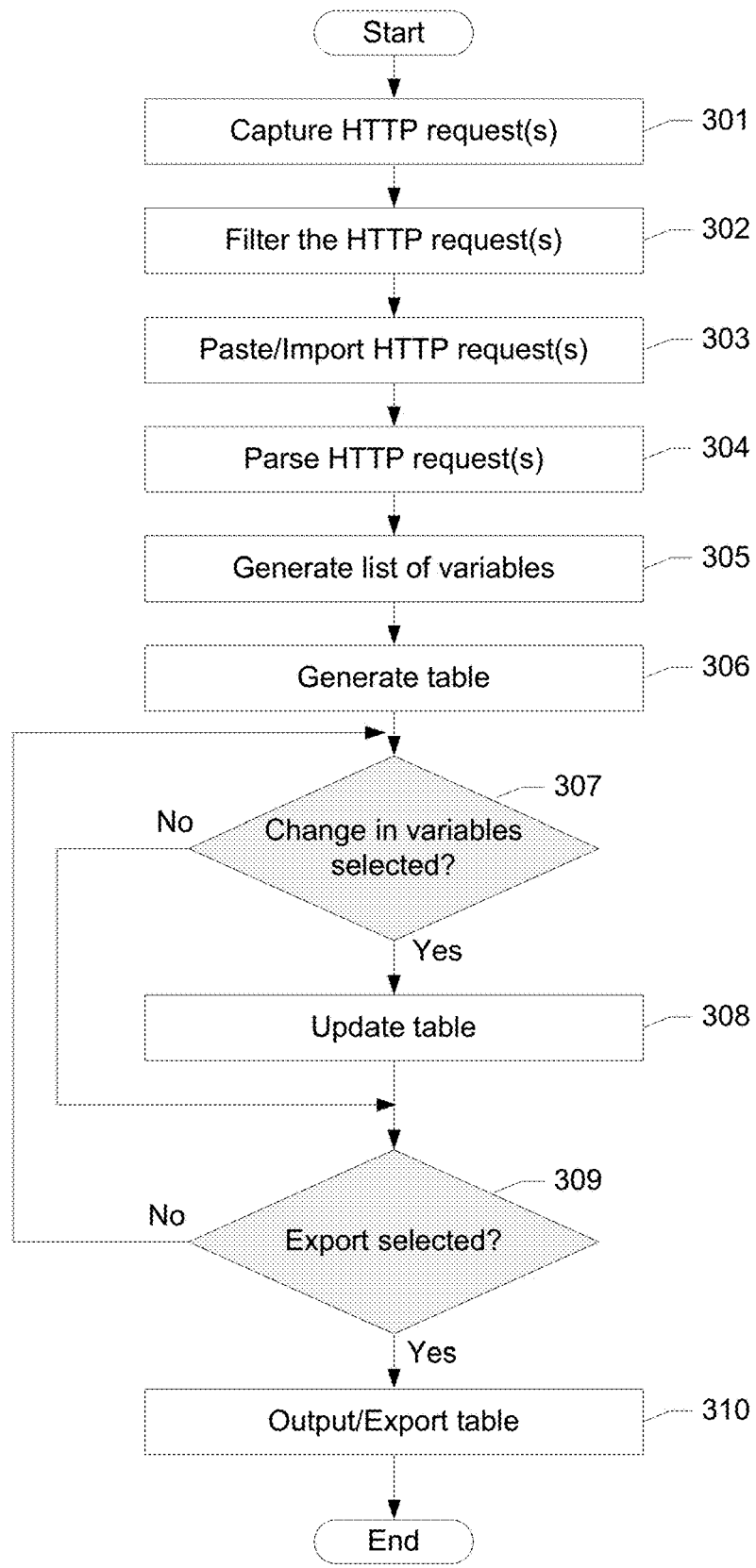
FIG. 3 illustrates a flow diagram of an example process in accordance with aspects of the present disclosure.

FIG. 3 illustrates a flow diagram for an example method in accordance with aspects of the present disclosure. More specifically, FIG. 3 illustrates a plurality of steps of a first method for testing a webpage. The steps of FIG. 3 may be performed by the testing tool 101. As a result of the method of FIG. 3, a tester may evaluate select variables and generate a tabulated report of the test results.

The method of FIG. 3 may begin with a step 301 of capturing one or more HTTP requests. An HTTP request may be generated in response to various user actions, such as typing a uniform resource locator (URL) into a search field of a web browser or selecting an element designed to make a request when selected (e.g., an element associated with an <a> tag or an element with an <img> tag). An HTTP request may be generated to, for example, load a web page or retrieve an image or other content for an already loaded web page. As a user interacts with a web browser, the web browser may execute various HTTP methods, such as the GET and POST methods, to generate HTTP requests. The web browser generates an HTTP request and transmits the HTTP request via the Internet to a web server hosting the webpage related to the request. For example, when a user types a URL into a web browser, the web browser generates an HTTP request for the webpage associated with the URL. This HTTP request is then transferred through the Internet, and eventually arrives at a web server that stores the associated webpage. The webpage is then transferred to the web browser that made the request. Once the webpage is rendered by the web browser, a user may select various elements on the webpage. Some elements may trigger some type of action, such as a request for another webpage or execution of a script (e.g., JAVASCRIPT), when they are selected (e.g., clicked) or otherwise interacted with (e.g., in response to a mouse-over event). If an element with, for example, a link for a second webpage is selected by a user, the web browser may generate a second HTTP request for the second webpage. Or, if an element, such as a submit button on the bottom of a form, is selected by a user, the web browser may generate another HTTP request. Each element may cause a unique HTTP request to be generated. Further, a single action may result in one or multiple HTTP requests. For example, selection of a single image on a webpage may result in many HTTP requests.

In step 301, a tester may cause a certain webpage to be loaded and select certain HTTP requests that the tester would like to test. In some embodiments, the tester may use a web browser with a plug-in (e.g. a third party plug-in) for capturing HTTP requests as the tester interacts with the webpage using the browser. In other embodiments, the tester may use another (other than a web browser) application or web-based application that is configured to capture HTTP requests related to a webpage. Still, in some embodiments, the testing tool 101 itself may function as a web browser or another application to access webpages and capture HTTP requests as the tester manipulates the webpages. For example, the testing tool 101 may include a module for testers to access a webpage, interact with the webpage, and capture HTTP requests according to the interactions. The testing tool 101 may be a plug-in (or add-in) for a known web browser or include its own proprietary web browser. In some embodiments, the testing tool 101 may be a plug-in for a known web browser and perform the testing of the HTTP requests entirely within the web browser. Alternatively, in some embodiments, the testing tool 101 may include multiple modules where one module functions as a plug-in to a web browser to output (or export) HTTP requests to another module for testing.

Figure 4A:
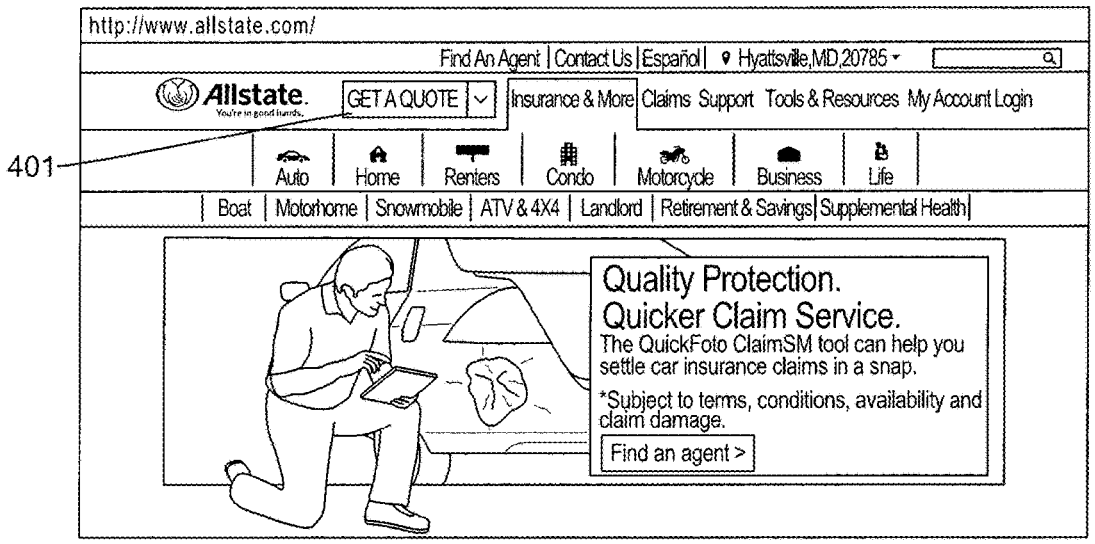
FIGS. 4A, 4B, and 4C illustrate example diagrams of an environment in which aspects of the present disclosure may be practiced.
Figure 4B:
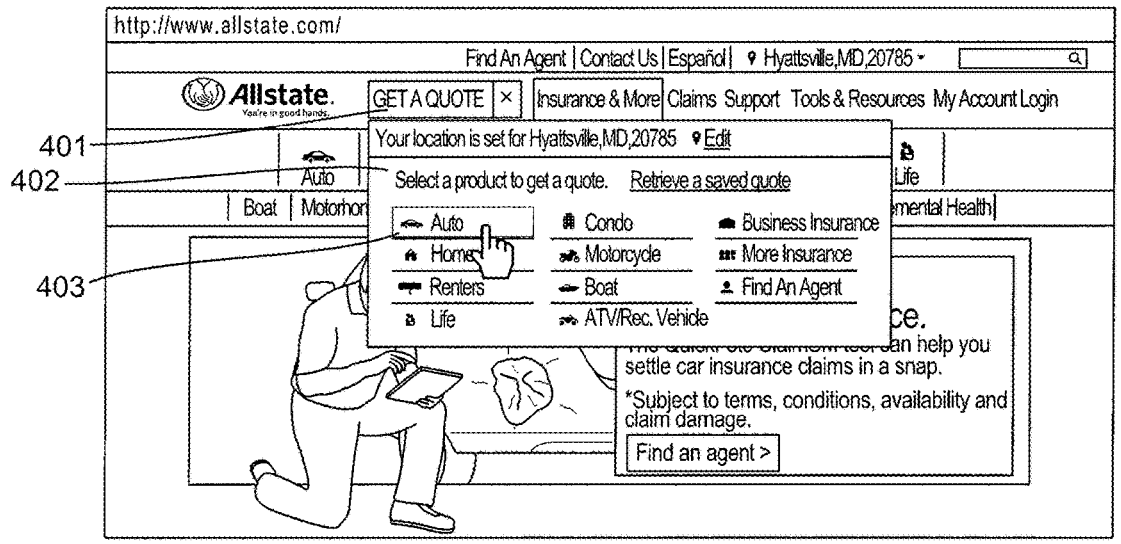
Figure 4C:
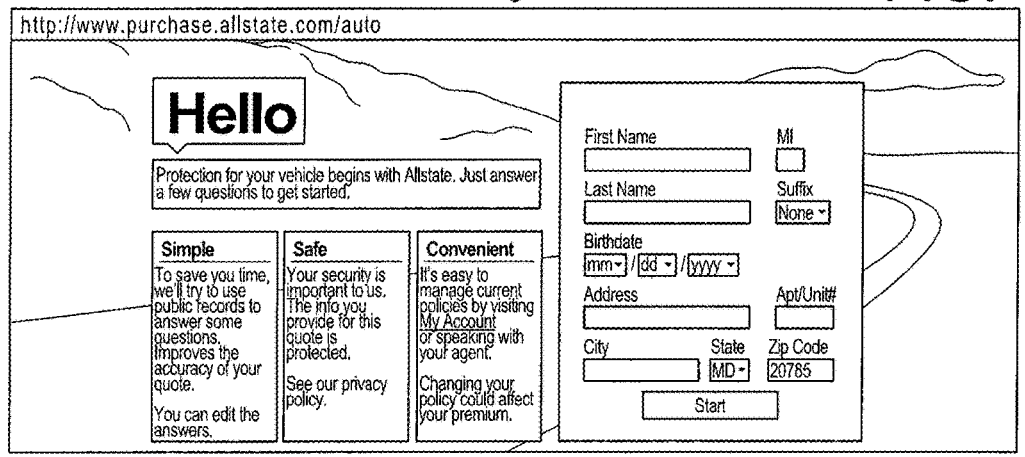

FIGS. 4A-4C illustrate an example series of actions that a tester may perform to generate and capture a series of HTTP requests for testing purposes. FIG. 4A illustrates an example webpage to be tested. A tester may navigate a web browser 205 to access the webpage of FIG. 4A by entering a URL into a search field of the webpage or by clicking on a link on another webpage. When the tester performs such an action to request the webpage of FIG. 4A, one or more HTTP requests are generated by the web browser. The testing tool 101 or another program may capture these HTTP requests as a first set of requests of a series of HTTP requests to be tested. If the tester wants to test whether a drop down menu 401 on the webpage of FIG. 4A is executing properly, the tester may select the drop down menu 401. This selection may cause a script (e.g., JAVASCRIPT) to execute and another set of one or more HTTP requests to be generated and transmitted by the web browser 205. For example, selecting the drop down menu 401 may generate one or more HTTP requests that cause server-side JAVASCRIPT code to be executed. The testing tool 101 or another program may capture these HTTP requests as a second set of requests of the series of HTTP requests to be tested.

As shown in FIG. 4B, selection of the drop down menu 401 may cause the web browser 205 to display a pop-up window 402. The pop-up window 402 may include a number of links to other webpages. The tester may choose to test one of these links as well. For example, the tester may choose a first link 403 (e.g., the "Auto" link) thereby causing the web browser 205 to generate yet another set of one or more HTTP requests. These HTTP requests may be include a request to access another webpage, such as the webpage shown in FIG. 4C. The testing tool 101 or another program may capture these HTTP requests as a third set of requests of the series of HTTP requests to be tested. In the illustrated example of FIGS. 4A-4C this is the last of the requests to be tested. Thus, in sum, the example test of FIGS. 4A-4C may include three sets of HTTP requests: 1) a first set of requests to load the webpage of FIG. 4A, 2) a second set of requests to execute a script to display the pop-up window 402 with the first link 403 when the drop down menu is selected as shown in FIG. 4B, and 3) a third set of requests to load the webpage of FIG. 4C when the first link 403 is selected. Different tests may include more or fewer sets of HTTP requests. Any number and any type of HTTP request may be tested with the testing tool 101 of the present disclosure.

Returning to FIG. 3, in step 302, the HTTP requests may be filtered. As mentioned above, multiple HTTP requests may be generated in response to a single action by the tester. While the tester may be interested in testing the webpage when a particular action or sequence of actions take place, the tester might not be interested in all HTTP requests resulting from that action or sequence of actions. Accordingly, the tester may wish to filter out certain HTTP requests that are not of interest. The tester may carry out such filtering by setting criteria of filters. The filters may be implemented in the web browser or plug-in thereof or the testing tool 101. For example, the tester may set criteria in the third party plug-in so that the third party plug-in only captures HTTP requests that meet the criteria or excludes HTTP requests that meet the criteria. In some examples, the testing tool 101 may include one or more options for the tester to set criteria for one or more filters and apply the filters to the captured HTTP requests.

In step 303, the captured, and optionally filtered, HTTP requests may be imported into a first user interface 500 (see FIG. 5) for testing. The HTTP requests may be imported by copying the HTTP requests from a third party program used to capture HTTP requests and pasting them in the first user interface 500. Alternatively, where the testing tool 101 is configured to capture HTTP requests, the testing tool 101 may import the HTTP requests from one screen into the first user interface 500 at step 303. Notably, one or more HTTP requests may be pasted or imported at once.

Figure 5:
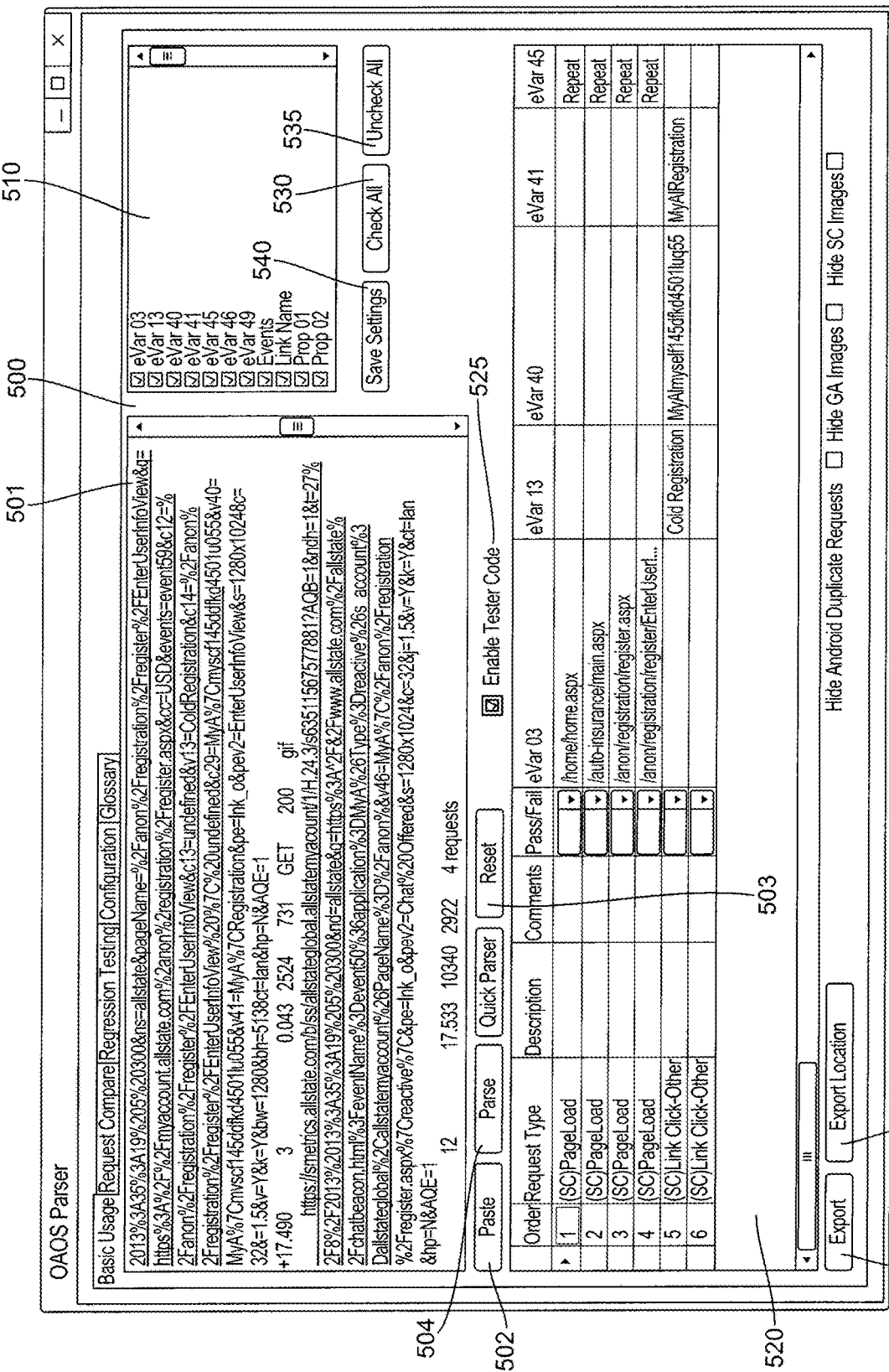
FIG. 5 illustrates an example user interface that may be presented by computing devices configured according to aspects of the present disclosure.

As shown in FIG. 5, the first user interface 500 may include a first pane 501 for displaying the pasted or imported HTTP requests. FIG. 5 also shows that the first user interface 500 may include a paste/import button 502 for causing the pasting or importing of the HTTP requests into the first pane. If an HTTP request is copied to the clipboard of the operating system from another program interface, then the testing tool 101 may paste the HTTP request from the clipboard into the first pane 501 when the paste/import button 502 is selected. If HTTP requests are captured by another module of the testing tool 101, then the testing tool 101 may import the most recently captured HTTP request(s) into the first pane 501 when the paste/import button 502 is selected. As such, a tester may quickly import or paste HTTP requests into the first pane 501. Further, as shown in FIG. 5, the first user interface 500 may also include a reset button 503 to quickly remove the data imported/pasted into the first user interface 500. This feature may be particularly useful when a tester wants to remove an HTTP request that is not of interest or begin a new test.

In step 304, the testing tool 101 may parse the HTTP requests that have been imported or pasted into the first pane. As mentioned above, HTTP requests may include numerous variables and values thereof as well as other values of headers, cookies, and query strings. Each HTTP request may include numerous characters, which may make it difficult to decipher the HTTP requests. Moreover, different characters representing different values and properties of the HTTP requests may appear as one long string of characters (e.g., a query string); thus, making it further complicated to decipher. The following is an example of a single illustrative HTTP request:

http*://metrics.allstate.com/b/ss/allstateglobal,allstate-wwwallstate/1/H.24.3/
s01067417120644?AQB=1&ndh=1&t=24%2F2%2F2014%2016%3A6%3A38%201%20240&ns=allstate&pageName=%2Fsnowmobile-insurance%2Fmain.aspx&g=http%3A%2F%2Fwww allstate.com %2Fsnowmobile-insurance.aspx&r=http%3A%2F%2Fwww.allstate.com%2F&cc=USD&ch=snowmobile-insurance&server=www.allstate.com&v3=%2Fsnowmobile-insurance%2Fmain.aspx&c10=1899%7C380%7C721620&v10=1899%7C380%7C721620&c12=%2Fhome%2Fhome.aspx&c13=Snowmobile&c14=%2Fhome%2Fhome.aspx%20%7C%20Snowmobile&c15=IconTopNavigation&c28=h24%7Cv1.3%7C20140117&c31=%2Fsnowmobile-insurance%2Fmain.aspx%7Chttp%3A%2F%2Fwww.allstate.com %2Fsnowmobile-insurance.aspx&c34=D%3DUser-Agent&c36=Repeat&c44=MST%3A0%7CGDC%3A0%7CPAG%3A0%7CLNG%3A%7CCTY%3AHyattsville%7CSTC%3AMD%7CZPC%3A20785%7CCNT%3A%7CCRT%3AUSA%7CHA%3A0%7CHP%3A0&c45=HAP%3A0%7CHWRVP%3A0%7CHBP%3A0%7CHHOP%3A0%7CHRFP%3A0%7CHLP%3A0%7CHANP%3A0%7CHSAP%3A0%7CHMHP%3A0%7CHMCP%3A0%7CHTP%3A0%7CHLIP%3A0%7CHRVP%3A0%7CHRNP%3A0%7CHLLPP%3A0%7CHCNP%3A0%7CHMOHP%3A0%7CHPUP%3A0%7CHFLP%3A0%7CHORVP%3A0&v45=Repeat&v49=D%3DUser- Agent&12=MST%3A0%7CGDC%3A0%7CPAG%3A0%7CLNG%3A0%7CCTY%3AHyattsville%7CSTC%3AMD%7CZPC%3A20785%7CCNT%3A%7CCRT%3AUSA%7CHA%3A0%7CHP%3A0&s=1366x768&c=32&j=1.5&v=Y&k=Y&bw=1920&bh=384&ct=lan&hp=N&AQE=1

As another example, the following provides another illustrative HTTP request: http*://www.googleanalytics.com/collect?v=1&_v=j18&a=882215598&t=pageview&_s=1&d1=http%3A%2F%2Fholidaydecorator.allstateonline.com%2F&dp=%2FAHD%2Fstreetview%2F&ul=enus&de=UTF8&dt=%2FAHD%2Fstreetview%2F&sd=24bit&sr=1152x870&vp=1152x601&je=1&fl=12.0%20r0&u=eAC~&cid=1986673297.1392162126&fid=UA-46046534-3&z=1624456582

Using the testing tool 101, such HTTP requests may be parsed. The testing tool 101 may include a module of code that analyzes one or more HTTP requests and separates the requests into its different components (e.g., headers, field-value pairs, etc.). The testing tool 101 may perform various algorithms to analyze and parse the HTTP requests.

Referring to FIG. 5, the parsing may be performed in response to selection of a parse button 504 (or in response to a selection of a quick parse button that may cause the pasting/importing of HTTP requests at the same time as triggering parsing). When the parse button 504 is selected (e.g., clicked), the testing tool 101 may execute an algorithm to parse the one or more HTTP requests pasted/imported in the first pane 501. In some embodiments, the testing tool 101 may begin parsing by identifying the different HTTP requests in the first pane 501. For example, if there are three HTTP requests in the first pane 501, the algorithm may determine that there are three HTTP requests and split the three requests up by storing them into different arrays. The algorithm may count the number of HTTP requests as it parses the data and may create an equal number of variables or arrays to which the HTTP requests are assigned.

In some embodiments, the algorithm may use regular expressions to identify HTTP requests among a continuous string of characters. For example, the following expression may be used for to identify HTTP requests: @"(?<Protocol>\w+):\/\/(?<Domain>[\wA][\w.:A]+)\/?[\w\.?=%&=\-A/$,]*". Once HTTP requests have been identified, they may be added to an array. In some instances, the identified HTTP requests may be added to a Dictionary, which is a variable type in the C # programming language. Then, to build a data table, code may be executed to loop through the array of HTTP requests and identify variables and their values by splitting each HTTP request string on the "&" character (which may indicate the start of a new variable in an HTTP request). At this point, an array of items that are of the form "variable=value" may be obtained. Next, to build an array of variables and values, code may be executed to split the data on the "=" character.

In some embodiments, to identify the different HTTP requests, the algorithm may search (e.g., traverse) the data in the first pane 501 for a particular set of characters indicating the beginning of an HTTP request (e.g., "http://" and/or "https://"). Upon identifying the start of an HTTP request, the algorithm may place each character in an array for that HTTP request until it arrives at the start of the next HTTP request. In addition, the testing tool 101 may evaluate the HTTP requests character-by-character to parse out the different components. For example, the testing tool 101 may perform an algorithm that searches a query string for the ampersand character ("&") and separates components based on results of the search. One skilled in the art would understand that numerous algorithms may be used to leverage the syntax used by HTTP standards to parse the HTTP requests.

Further, the testing tool 101 may be configured to parse requests for different versions of HTTP and different web browsers or mobile application operating systems. Different versions of HTTP and different web browsers may cause different HTTP requests to be generated for the same action (e.g., clicking the same link of the same webpage). Although the HTTP requests from different browsers may have similar properties in order to comply with the HTTP specification, the testing tool 101 may use different modules and/or algorithms to parse the requests based on the different web browsers. The testing tool 101 may also use different modules and/or algorithms to parse the requests based on the different versions of HTTP.

In step 305, the testing tool 101 may generate a list of variables. Step 305 may be performed in response to selection of the parse button 504. Generation of the list of variables may use the results from parsing at step 304. The list of variables may include variables identified from within each of the HTTP requests when parsing. For example, as the testing tool 101 parses the HTTP requests, it may discover variables. As the testing tool 101 discovers variables, it may store the variables in a vector or array so a list of variables may be readily formed. Additionally, or alternatively, the list of variables may include a list of expected variables of the HTTP request. For example, the list of variables may include all known variables of an HTTP request.

As a result of parsing, the testing tool 101 may display the list of variables in a second pane 510 of the first user interface 500 at step 305. In some embodiments, the list of variables may be sorted and displayed in a particular order (e.g., alphabetical order). The list of variables may be sorted, for example, based upon program logic or based upon interaction or based upon interaction of the program user interface elements by the tester. Further, the list of variables may be displayed in a manner such that each variable may be selected. For example, as illustrated in FIG. 5, each variable may be associated with a respective check box for selecting that variable. In other examples, different objects may be used to select the variables. For example, each variable may be associated with a radio button or an object that slides back and forth between "yes" and "no." In some examples, the variable names may be selectable. For example, clicking the text of the variable name could change the font of the text or highlight the text to indicate that the variable is selected.

In some embodiments, when the list of variables is initially displayed, the testing tool 101 may select certain variables (e.g., check certain boxes associated with certain variables). In other words, the testing tool 101 may be configured to automatically select one or more variables when initially generating the list of variables and displaying that list in the second pane 510. For example, the testing tool 101 may be configured to initially select only certain variables expected to be of interest to the tester. For example, the testing tool 101 may be configured to initially select all variables other than those specific to a web browser (e.g., a variable indicating a property of the web browser). In some embodiments, all or none of the variables may be initially selected. Additionally, the tester may select a subset of variables and save this subset as a list of preferred variables that may be retrieved during a subsequent session in which the tool is used.

Further, the testing tool 101 may generate a table at step 306. The table may be generated simultaneously (or at about the same time) with the generating of the list of variables as a result of parsing at step 304. Referring to FIG. 5, the testing tool 101 may display the generated table in a third pane 520 of the first user interface 500. As shown in FIG. 5, the table may include a heading (e.g., "Order," "Request Type," "Description," etc.) for each column describing the type of information in that column.

The table may include a row for each HTTP request and a column for each selected variable of each HTTP request. For example, if there are two requests and twenty selected variables, then the testing tool 101 may generate a table with two rows and at least twenty columns. In determining the number of rows and columns to generate the table, the testing tool 101 may use a count of HTTP requests and a count of variables made when parsing. Alternatively, the testing tool 101 may count the number of HTTP requests and number of variables after parsing is completed.

In columns related to variables, the variable name (e.g., "eVar 03," "Prop 02," "dp," "vp," etc.) may appear in the column heading and the values for the corresponding variable may appear in that column in the appropriate row for the appropriate request. For example, if a value of the variable "eVar 13" of the fifth HTTP request is "ColdRegistration," then the value "ColdRegistration" is added to the cell in the fifth row for the fifth HTTP request under the column having the "eVar 13" heading.

Other columns may be included for information other than variable values. For example, the testing tool 101 may generate a first column (e.g., a left-most column) with a unique identifier (e.g., a number) for each request in the series of requests being tested (e.g., each request in the first pane 501). The HTTP requests may be assigned sequential numbers in the order that they appear in the first pane 501. That is, the first request appearing in the first pane 501 may be assigned identifier number "1" and information extracted from it may go into the first row of the table, while the second request appearing in the first pane 501 may be assigned identifier number "2" and information extracted from it may go into the second row of the table.

The testing tool 101 may also generate an additional column to reflect the type of request (e.g., page load, link click, etc.). Further, one or more additional columns may be added for the tester to modify. For example, a column with the heading "Description" may be added for the tester to add text describing the request. Also, a column with the heading "Comments" may be added for the tester to add comments about the request, such as a reminder to review the request in the future. Another column with the heading "Pass/Fail" may be added for the tester to indicate whether the request passes or fails the test as determined by the tester. A tester may determine that the request passes if the webpage loads within a certain amount of time with a particular value for a particular variable. On the other hand, the tester may determine that the request fails if the webpage loads too slowly and/or a particular value exists (or does not exist) for a particular variable. In some embodiments, like the one shown in FIG. 5, the testing tool 101 may generate a drop down menu in each cell in the "Pass/Fail" column so that the tester may quickly indicate whether the request passes or fails.

While some columns (e.g., the "Description" column, the "Comments" column, and the "Pass/Fail" column) of the table may be modified, the testing tool 101 may prevent other columns from being modified. For example, the testing tool may prevent the values of the variables from being changed. Thus, the testing tool 101 may protect the integrity of the data.

In some embodiments, the tester may have some control over which columns appear in the table. For example, as shown in the example of FIG. 5, the first user interface 500 may include an option 525 to enable the tester to control whether certain columns are included in the table. In particular, the option 525 may control whether the "Description" column, the "Comments" column, and the "Pass/Fail" column are included within the table. In some embodiments, if this option 525 is selected (e.g., the box for the option is checked), the testing tool 101 may include certain columns in the table that the tester can modify. In some cases, the tester might not want to add information and may simply want the values of the variables, and therefore, might not select the option 525. Although option 525 is shown on the user interface 500 in the example of FIG. 5, it should be understood that this option, like any other option described herein, may be available through a toolbar or tab within the testing tool 101.

Further, in some embodiments, the testing tool 101 may allow the tester to rearrange the columns. As a default (which the tester may change), the testing tool 101 may arrange the columns, or a subset thereof (such as the columns related to variables), in alphabetical order from left to right. Different testers may want the columns to be arranged in a particular order, and so the testing tool 101 may be configured to permit testers to arrange the order however they choose. For example, a tester may be able to select and drag a column to move it further to the left or further to the right. In addition, in some embodiments, the testing tool 101 may allow the rows to be rearranged. Generally, the testers may want the rows to remain in the order that the HTTP requests were made, and thus, the testing tool 101 may lock the rows so that they cannot be easily rearranged (e.g., accidently rearranged). However, the testing tool 101 may allow the rows (and columns for that matter) to be deleted so that the table can be reduced in size to focus on particular results of interest.

In step 307, the testing tool 101 may determine whether a change in which variables are selected occurs. As described above, the testing tool 101 may automatically select certain variables from the list of variables. The tester, however, may select or unselect variables from the list of variables. When the variable in the list of variables is selected, it is included in the table. If the variable in the list of variables is not selected, it might not be included in the table. As such, a tester may choose those variables that are of interest.

In some embodiments, the first user interface 500 may include an option 530 for selecting all variables in the list of variables and/or an option 535 for unselecting all variables in the list of variables. Further, when the tester is satisfied with which variables are selected, the tester may choose an option 540 for saving which variables are selected. This option allows a tester to use the same set of selected variables for subsequently testing other HTTP requests (which may be different HTTP requests altogether or similar HTTP requests captured later in time).

If the testing tool 101 detects changes to the selected variables (Yes at step 307), the testing tool may automatically update the table at step 308. For example, if the testing tool 101 detects that the tester has selected an additional variable from the list of variables in the second pane 510, the testing tool 101 may generate an additional column in the table displayed in the third pane 520. The additional column may be given a column heading with the name of the additional variable selected. Also, for example, if the testing tool 101 detects that the tester has unselected one of the variables in the list of variables in the second pane 510, the testing tool 101 may remove the corresponding column from the table 101. Accordingly, the tester may control the amount of data included in the table in the third pane 520.

In some cases, for example, the tester may be satisfied with whichever variables are initially selected and might not make changes to the selected variables in the listing of variables of the second pane 510 (No at step 307). In such cases, the table might not be updated.

In step 309, the testing tool 101 may determine whether a choice to output or export the table has been made. The testing tool 101 may monitor user inputs to determine whether a user (e.g., tester) has selected to output/export the table. For example, the testing tool 101 may determine whether an export button 545 on the first user interface 500 has been selected (see FIG. 5). If the tester has not chosen to output/export the table (No at step 309), the testing tool 101 continues to check whether updates to the selected variables have been made.

If the testing tool detects that the tester has selected to output/export the table (Yes at step 309), the testing tool may output or export the table at step 310. Step 310 may include forming a file representing the table so that the file may be exported for use with another application (e.g., MICROSOFT EXCEL). For example, step 310 may include forming a Comma Separated Values (CSV) file with a ".csv" filename extension. The table may be exported to a location chosen by the tester. As shown in FIG. 5, the first user interface 500 may include an option 550 for designating a location to which the table is to be outputted/exported. A tester may select this option 550 to designate that the table should be outputted/exported to, for example, the local network server 220 (see FIG. 2) or another computing device 100 operated by another member in a team of testers. In some embodiments, the testing tool 101 may export variables selected by the tester in the order specified by the test. In addition to exporting the variables, the testing tool 101 may export tester editable fields (e.g., comments and description fields) along with pass/fail status information (e.g., information identifying specific variables that resulted in the fail status).

Additionally, or alternatively, the table may be saved on memory of a computing device 100 executing the testing tool 101, or other memory (e.g., flash drive). After storing the table, the testing tool 101 may, at any time, be opened and operated to recall the stored table so that tester or other personnel (e.g., supervisors) may review the table. Further, in some embodiments, the testing tool 101 may be configured to store files so that when they are reopened at a later time, the testing tool 101 may regenerate the first user interface. For example, the testing tool 101 may store a type of file designed specifically for the testing tool 101 that allows the testing tool 101 to recreate the first user interface 500.

It should be understood that, in some embodiments, steps of FIG. 3 may be performed in other than the recited order. For example, the HTTP requests may be filtered after they are imported into the first user interface 500. In some embodiments, the first user interface may include one or more options (e.g., buttons) for setting filtering criteria and applying a filter to the imported HTTP requests.

Figure 6:
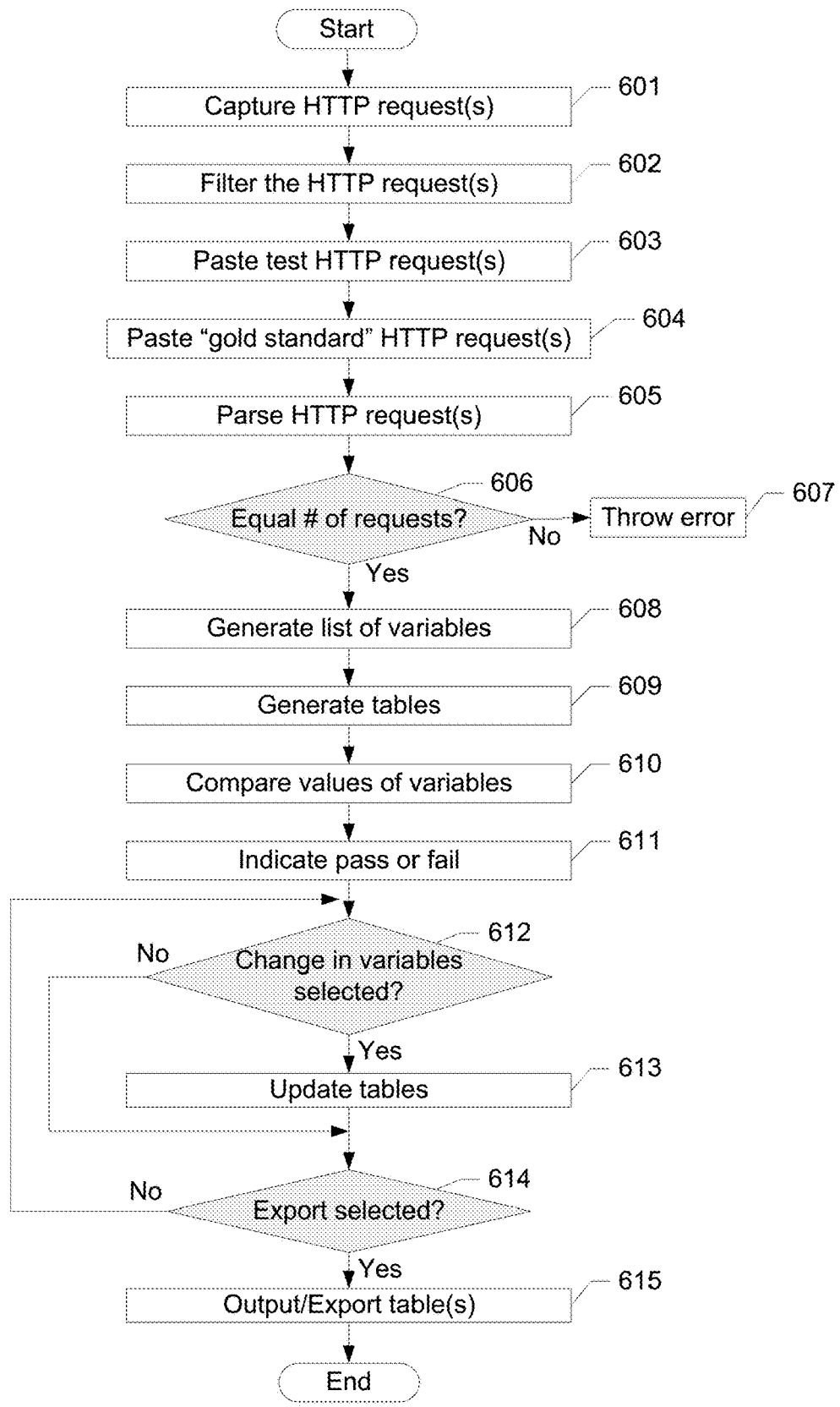
FIG. 6 illustrates a flow diagram of another example process in accordance with aspects of the present disclosure.

FIG. 6 illustrates another flow diagram for another example method in accordance with aspects of the present disclosure. More specifically, FIG. 6 illustrates a plurality of steps of a second method for testing a webpage. The steps of FIG. 6 may be performed by the testing tool 101. As a result of the method of FIG. 6, automatic regression testing may be performed. Further, the steps of FIG. 6 will be described with reference to FIG. 7, which illustrates an example of a second user interface 700 designed for regression testing.

Many of the steps of the second method of FIG. 6 are similar to those of the first method of FIG. 3. The description of the second method herein focuses on the differences; however, it should be understood that any of the features of the first method may be incorporated into the second method. Also, where steps are similar, the testing tool 101 may call the same software functions and/or use the same software classes (e.g., JAVA classes) to perform the steps.

In the example of FIG. 6, the second method begins with steps 601-603. Steps 601-603 may be performed in a similar manner as steps 301-303, respectively. However, in step 603, the captured HTTP requests to be tested may be imported into a second user interface 700 (see FIG. 7) particularly configured for performing regression testing. In particular, the captured HTTP requests may be imported/pasted into, for example, a first pane 701 of the second user interface 700. Although the description herein discusses a case in which the captured HTTP requests are imported/pasted into the first pane 701, they may also be imported/pasted into a second pane 702 of the second user interface 700.

In step 604, the tester may import/paste a "gold standard" (or "control") series of HTTP requests against which the tester desires to test the HTTP requests captured in step 601. The "gold standard" series of HTTP requests may include one or more requests that the tester has previously confirmed are acceptable (e.g., were made when the webpage to be tested performed as desired). For example, the gold standard series of HTTP requests may have been previously captured as a result of performing the same actions that were performed to capture the HTTP requests in step 601. In other words, the gold standard series of requests may correspond to the HTTP requests captured in step 601.

Figure 7:
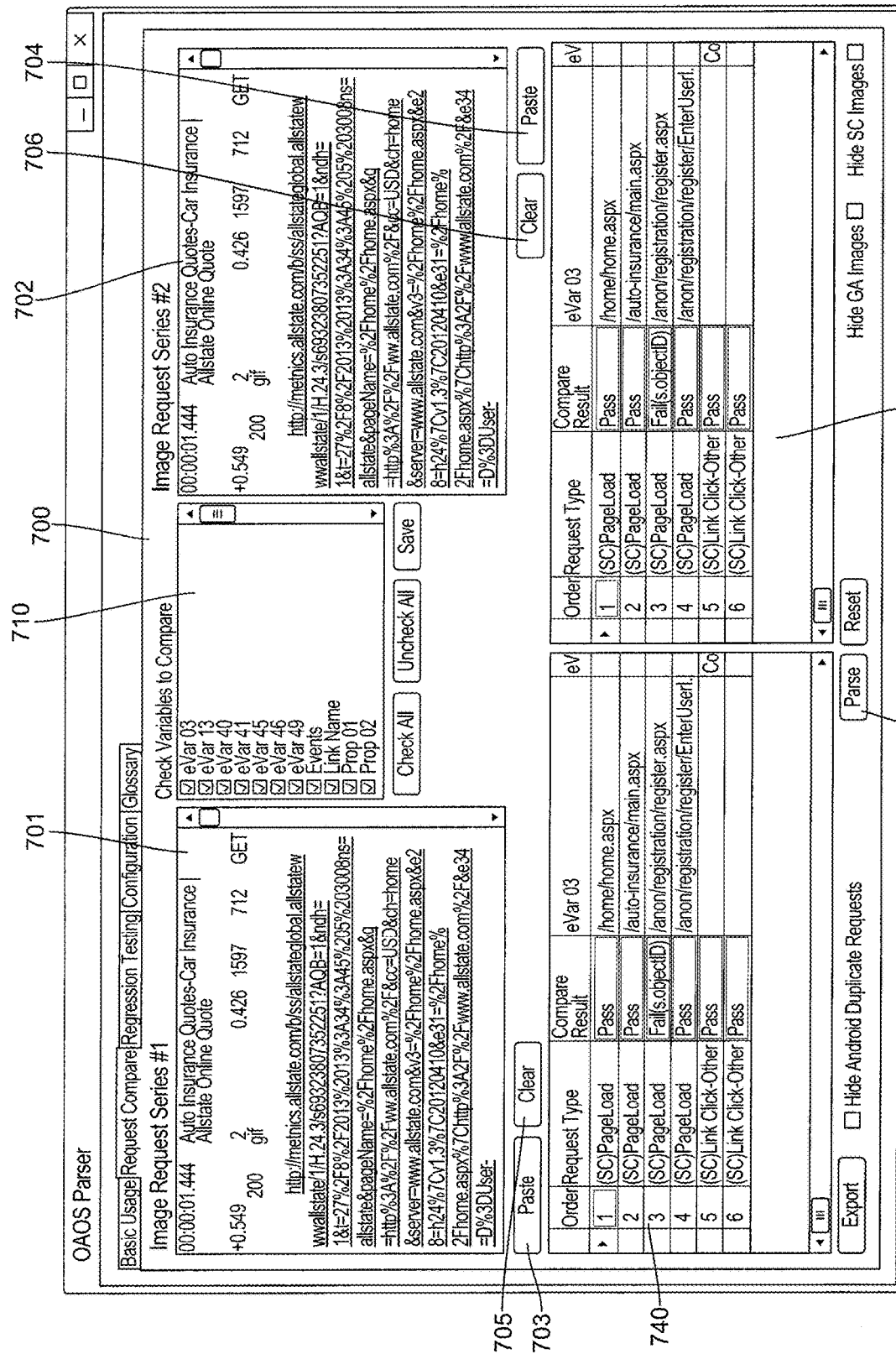
FIG. 7 illustrates another example user interface that may be presented by computing devices configured according to aspects of the present disclosure.

In step 604, the gold standard HTTP requests may be imported/pasted into, for example, the second pane 702 of the second user interface 700. Although the description herein discusses a case in which the gold standard HTTP requests are imported/pasted into the second pane 702, they may also be imported/pasted into a first pane 701 of the second user interface 700 if the HTTP requests captured in step 601 have been imported/pasted into the second pane 702. Further, it should be understood that the order in which the gold standard HTTP requests and the recently captured HTTP requests are imported/pasted may be switched. Also, a series of HTTP requests may be imported/pasted into the second pane 702, before another series of HTTP requests is imported/pasted into the first pane 701. As shown in FIG. 7, the second user interface 700 may include a first paste/import button 703 to trigger importing/pasting HTTP requests into the first pane 701 and a second paste/import button 704 to trigger importing/pasting HTTP requests into the second pane 702. Moreover, the second user interface 700 may include a first clear button 705 and a second clear button 706 for clearing (e.g., deleting or removing) HTTP requests from the first pane 701 and the second pane 702, respectively.

In some embodiments, the gold standard series of HTTP requests may be stored on a web server 210 or a local network server 220. The testing tool 101 may permit the gold standard series of HTTP requests to be imported from these locations as well as other locations. Further, in some embodiments, the testing tool 101 may store the gold standard series of HTTP requests so that they are available to the tester. The testing tool 101 may permit a number of gold standards to be stored for different tests.

At step 605, the HTTP requests in both the first pane 701 and the second pane 702 of the second user interface 700 may be parsed. Parsing may be performed in a similar manner as described above with reference to step 304. Referring to FIG. 7, parsing at step 605 may be performed in response to a selection of a parse button 707 by the tester.

In step 606, the testing tool 101 may determine whether there are an equal number of HTTP requests in the first pane 701 as there are in the second pane 702. A tester may perform regression testing to test one series of HTTP requests against another. To do so in a meaningful way may require the two series of HTTP requests to include the same number of requests. Testers may perform numerous requests, even with respect to the same webpage, and therefore, may confuse which tests correspond to which gold standard. As such, by checking to see that the numbers of HTTP requests are equal, the testing tool 101 may catch mistakes on the part of the tester when HTTP requests from one test do not correspond to the imported/pasted gold standard series of requests.

The counts (e.g., the count of the HTTP requests in the first pane 701 and count of the HTTP requests in the second pane 702) to be compared in step 606 may be acquired when performing the algorithm used for parsing. Alternatively, the testing tool may perform additional counts separate from the algorithm used for parsing.

If the testing tool 101 determines that the counts are not equal (No at step 606), the testing tool 101 may throw an error at step 607. For example, the testing tool 101 may cause a pop-up window to be displayed with an error message indicating that there is an error and/or that the HTTP requests in the first pane 701 and the second pane 702 could not be compared. In some embodiments, the error message may indicate the different number of requests.

If the testing tool 101 determines that the counts are equal (Yes at step 606), the testing tool may generate a list of variables at step 608. Step 608 may be similar to step 305 discussed above. In step 608, the list of variables may be displayed in a third pane 710 of the second user interface 700. As before, the list of variables may be selectable, and some, all, or none may be initially selected.

In step 609, the testing tool 101 may generate two tables—one for each series of HTTP requests. In other words, the testing tool 101 may generate a first table for the HTTP requests to be tested of the first pane 701 and a second table for the gold standard HTTP requests of the second pane 702. The first table and second table may each be generated as discussed above with respect to step 306. For example, the first and second tables may be generated in accordance with the variables selected in the third pane 710 so that the first and second tables each have columns for the selected variables. As such, the first and second tables may be structurally similar (e.g., have a similar number of rows and columns, similar column headings, and corresponding HTTP requests may be in corresponding rows). By structuring the tables in a similar manner, similar values may be in similar cells so that the testing tool 101 may compare variables as discussed below.

Referring to FIG. 7, the testing tool 101 may display the first table in a fourth pane 740 and the second table in a fifth pane 750. The fourth pane 740 and the fifth pane 750 may be side-by-side so that the tester may readily appreciate the results. As shown in FIG. 7, the fourth pane 740 and fifth pane 750 are displayed side-by-side so that their centers are aligned in a horizontal direction. In other embodiments, the fourth pane 740 and fifth pane 750 may be displayed side-by-side so that their centers are aligned in a vertical direction. Further, the fourth pane 740 and the fifth pane 750 may be of equal size as may be the tables therein. Moreover, the fourth pane 740 and the fifth pane 750 may be linked to one another so that manipulating (e.g., zooming, scrolling, highlighting, etc.) one pane may cause a corresponding pane to be similarly manipulated. For example, the testing tool 101 may link operations of the fourth pane 740 and fifth pane 750 so that scrolling within one pane causes the other pane to scroll proportionally. For example, if the tester scrolls to the right to view values of variables in the right side of the first table of the fourth pane 740, the testing tool 101 may cause the fifth pane 750 to scroll to the right at the same speed so that the corresponding right side of the second table therein may be visible. By mirroring the treatment of the fourth pane 740 and fifth pane 750, the testing tool 101 may facilitate review and comparison of values within HTTP requests.

In step 610, the values of corresponding variables may be compared. For example, the testing tool 101 may compare the value of the variable "eVar 03" of the first request in the first table of the fourth pane 740 with the value of the variable "eVar 03" of the first request in the second table of the fifth pane 750. The testing tool 101 may compare each value in the first table with the corresponding value in the second table to determine whether the values of like variables match. In some embodiments, this comparison may be tight-fitting such that the values must be exactly the same in order to match. Such exact matching may be required if the values are text and/or numbers.

In step 611, the testing tool 101 may determine whether all values for variables of a request in the first table match all values for like variables of a corresponding request in the second table. In other words, the testing tool 101 may determine whether a request in the series of HTTP requests to be tested matches a corresponding request in the series of gold standard HTTP requests. If the values for a test HTTP request in the first table match the corresponding values of the corresponding gold standard HTTP request, then the testing tool 101 may determine that the test HTTP request passes the test. Further, the testing tool 101 may indicate that the test HTTP request passes within the table. The testing tool 101 may indicate the passing result by marking a cell in the row of the test HTTP request that passed under a result column as shown in FIG. 7. In some cases, as shown in the example second user interface 700, when the test HTTP request passes, the cell in the result column may be filled with a particular color (e.g., green) that the tester may recognize as a passing result.

In contrast, if one of the values for a test HTTP request does not match a value for the corresponding gold standard HTTP request, then the testing tool 101 may determine the test HTTP request has failed in step 611. Accordingly, the testing tool 101 may indicate the failing result by marking a cell in the row of the test HTTP request that failed under the result column as shown in FIG. 7. In some embodiments, a different color, than the color used to mark a test HTTP request that passed, may be used to mark a test HTTP request that failed so that the tester may quickly distinguish passing results from failing results. In some embodiments, upon detecting a fail result, the variables that caused the failure may be highlighted in a "Compare Result" column thereby notifying users of the particular variable(s) that caused the failure. Also, as shown in FIG. 7, the testing tool 101 may indicate the results of the test in each of the two tables so that the tester can easily see which test HTTP request passed/failed and which gold standard HTTP request was matched/unmatched.

In step 611, a pass or fail result may be determined and indicated for each of the HTTP requests to be tested. For example, if there are six HTTP requests to be tested against the gold standard, the testing tool 101 may determine six different pass or fail results. This may help the tester to pinpoint potential problems.

In some embodiments, the testing tool may highlight or otherwise flag values that do not match, and therefore, are the cause of a failing determination. If the tester determines that he/she is not concerned whether these variables match, the tester may unselect these variables in the third pane 710, so that they do not appear in the first and second tables and are not factored into the determination of whether the test HTTP request passes or fails.

For example, a tester may decide that he/she is not interested in whether a particular variable of the test request matches the corresponding variable in the gold standard request, and therefore, may unselect that variable from the third pane 710 so that the testing tool 101 may determine whether corresponding requests match regardless of the values of that unselected variable. For example, it may not be important to the tester that a variable carrying the date of a request is the same in both the test request and the gold standard request. The tester may thus unselect this variable, so that only variables of interest are compared and taken into account when determining if the test request matches the gold standard request.

The testing tool 101 may perform step 612 to determine whether a tester has made changes as to which variables are selected. The tester may unselect one or more variables and/or select one or more other variables. Step 612 may be similar to step 307. If changes are detected in step 612, the testing tool 101 may update the first and second tables in step 613, which may be similar to how the table was updated in step 308. If the tester unselects one or more variables, the corresponding one or more columns may be removed from the first and second tables. In comparison, if the tester selects one or more additional variables, one or more related columns may be added to the first and second tables.

In some embodiments, the tester may wish to focus on failing results. Therefore, the testing tool 101 may allow the tester to delete rows so that the tester may delete rows related HTTP requests that passed, leaving only the rows related to HTTP requests that failed. In this manner, the data of the tables may be reduced to focus on the test HTTP requests that failed to meet the gold standard. In some embodiments, the testing tool 101 may provide a single option that, when selected, causes the testing tool 101 to reduce the tables down to reflect only the failed requests.

Steps 614 and 615 may be performed in a similar manner as steps 309 and 310, respectively. Also, the second user interface 700 may include options (e.g., buttons) for selecting the export location and triggering the export of the first and second tables. The second user interface 700 may allow the tester to choose to export just the first table, just the second table, or both. In some embodiments, the first and second tables may be exported as different CSV files. Alternatively, the first and second tables may be saved in a single CSV file. Further, in some examples, the testing tool 101 may store files so that when they are reopened at a later time, the testing tool 101 may regenerate the second user interface 700 with both the first and second tables, the test HTTP requests, the gold standard, and the list of selected variables.

It should be understood that the steps of FIG. 6 may be performed in various orders. For example, filtering may be performed after the test HTTP requests are imported into the second user interface. Also, the gold standard HTTP requests may be imported before the test HTTP requests are imported. Further, other steps may be performed or steps might not be performed. For example, the tester may exit or close the testing tool 101 without exporting the tables.

Figure 8:
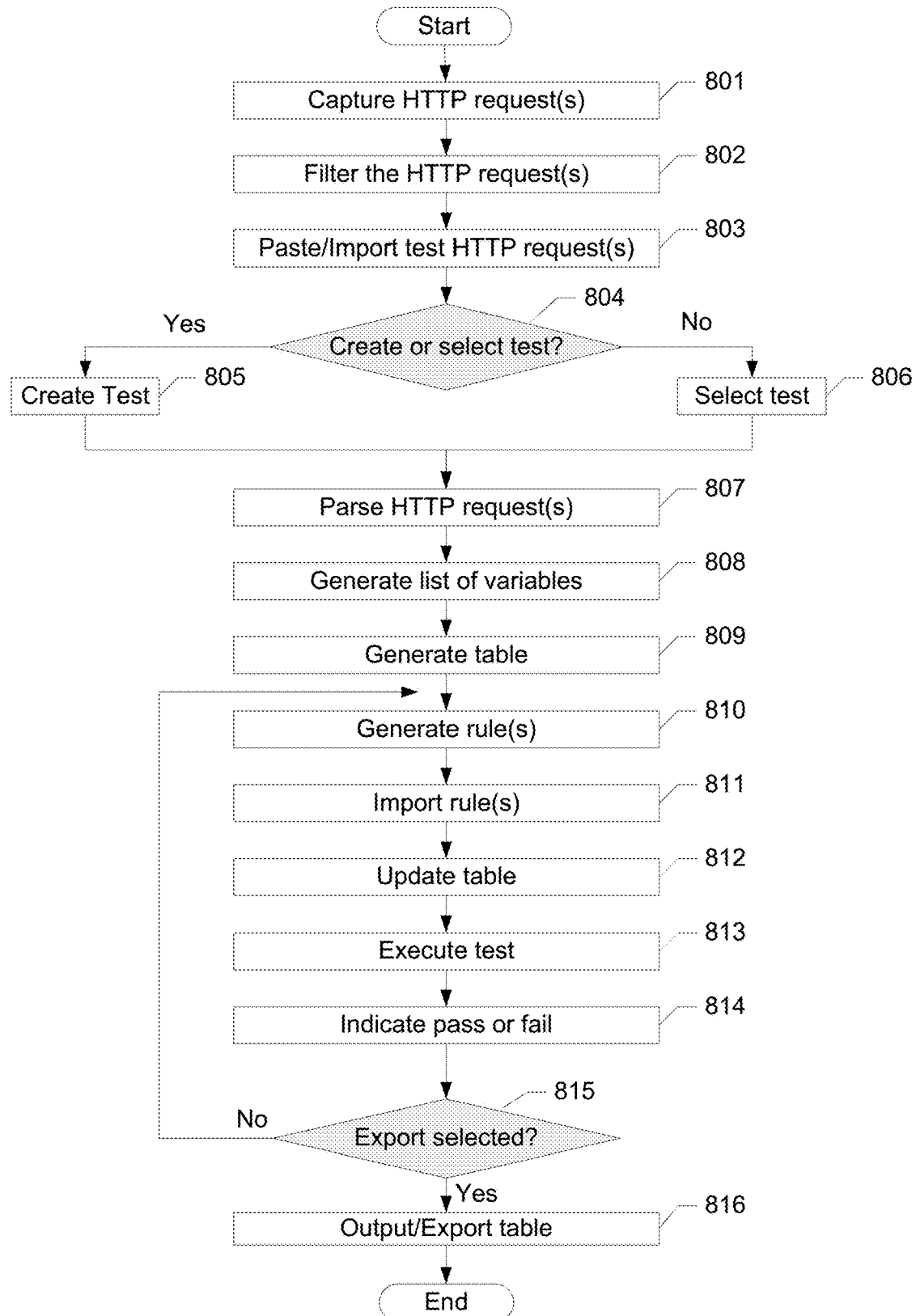
FIG. 8 illustrates a flow diagram of yet another example process in accordance with aspects of the present disclosure.

FIG. 8 illustrates yet another flow diagram for another example method in accordance with aspects of the present disclosure. More specifically, FIG. 8 illustrates a plurality of steps of a third method for testing a webpage. The steps of FIG. 8 may be performed by the testing tool 101. As a result of the method of FIG. 8, test rules may be created and applied to HTTP requests. Further, the steps of FIG. 8 will be described with reference to FIG. 9, which illustrates an example of a third user interface 900 designed for rule generation and rule-based testing.

Many of the steps of the third method of FIG. 8 are similar to those of the first and second methods of FIGS. 3 and 6. The description of the third method herein focuses on the differences; however, it should be understood that any of the features of the first and second methods may be incorporated into the third method. Also, where steps are similar, the testing tool 101 may call the same software functions and/or use the same software classes (e.g., JAVA classes) used in the first and second methods to perform the steps of the third method.

Figure 9:
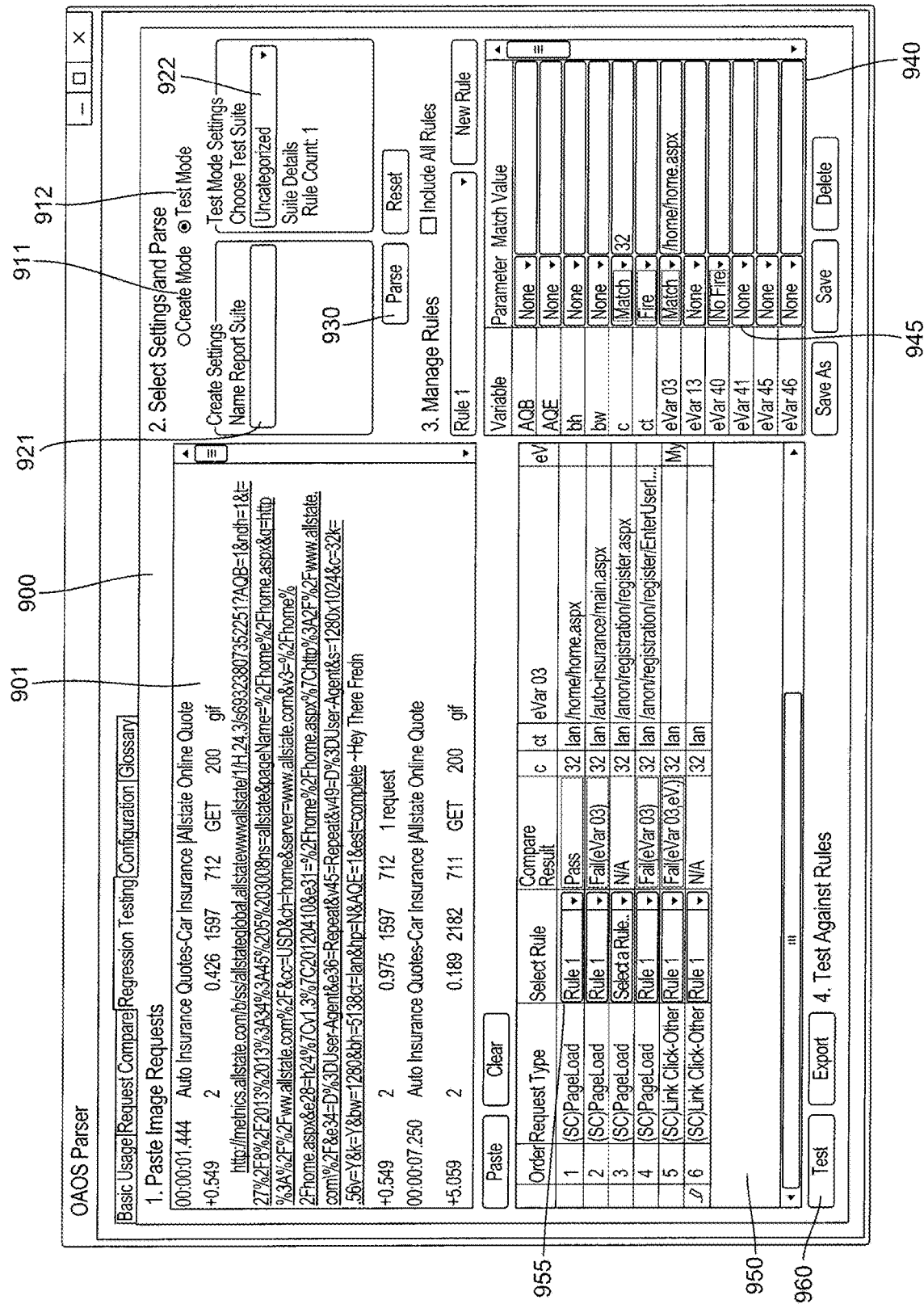
FIG. 9 illustrates yet another example user interface that may be presented by computing devices configured according to aspects of the present disclosure.

In the example of FIG. 8, the third method begins with steps 801-803. Steps 801-803 may be performed in a similar manner as steps 301-303, respectively. Referring to FIG. 9, in step 803, the captured HTTP requests to be tested may be imported/pasted into a first pane 901 of the third user interface 900.

In step 804, the user (e.g., tester) may choose whether to create a test or select a previously created test. A test may comprise, for example, a series of rules that may be connected in some way. For example, the rules of a common test may all refer to the same website (or mobile application) or section of a website (or mobile application) to be tested. The testing tool 101 may provide a first option 911 for creating a test and a second option 912 for selecting a previously created test. As shown in FIG. 9, the options 911 and 912 may be implemented with, for example, radio buttons. The testing tool 101 may monitor these options 911 and 912 to detect whether one of them is selected in step 804. Depending on which of the options 911 and 912 is selected, the testing tool 101 may provide or activate/enable other objects on the third user interface 900.

If a tester chooses to create a test, the testing tool 101 may provide or activate a field 921 for the tester to enter a name for the new test to be created at step 805. When the name is entered, the testing tool 101 may store the name for association with the generated rules described in further detail below. On the other hand, if the tester chooses to select a previously created test, the testing tool 101 may provide or activate another field 922 for the tester to indicate the name of the previously created test desired at step 806. In some embodiments, this field 922 may include a drop down menu listing the names of previously created tests to choose from.

In step 807, the HTTP requests to be tested may be parsed. Step 807 may be performed in response to selection of a parse option 930 (e.g., a parse button) of the third user interface 900. Parsing in step 807 may be performed in a similar manner as in step 304.

In step 808, the testing tool 101 may generate a list of variables discovered when parsing the one or more HTTP requests in the first pane 901. Referring to FIG. 9, the listing of variables may be displayed in a second pane 940. For one or more of the variables (or all variables) in the list of variables, the testing tool 101 may generate a rule-making object 945 for generating rules as described in further detail below. The rule-making objects 945 may appear side-by-side to their corresponding (or associated) variable within the second pane 940 as shown in FIG. 9.

In step 809, the testing tool 101 may generate a table with a row for each of the HTTP requests to be tested. Referring to FIG. 9, the testing tool 101 may display the table in a third pane 950 of the third user interface 900. Initially, the table may include a column (see the "Order" column in FIG. 9) with a unique identifier for identifying the HTTP requests to be tested. In the example of FIG. 9, the unique identifiers may be sequential numbers. The table may also initially include a column (see the "Request Type" column in FIG. 9) for indicating a type of request (page load, link click, etc.) for each HTTP request to be tested. This column may also contain an identifier (e.g., code) indicating the type of HTTP request by type of analytics system, platform, or technology (e.g., SiteCatalyst, Google Analytics, etc.). In addition, the table may initially include a column (see the "Select Rule" column in FIG. 9) in which the tester may designate a rule to be applied to the HTTP request associated with each row. As shown in FIG. 9, this column may include a rule-selecting object 455. The testing tool 101 may create a rule-selecting object 455 for each HTTP request to be tested. Further, in some embodiments, the testing tool 101 may create the table so that it initially has a column for each variable discovered during parsing. In other embodiments, however, the table might not have a column for a particular variable unless a rule involving that variable is implemented as explained in further detail below.

In step 810, the testing tool 101 may generate and record one or more rules. A rule may be generated for each HTTP request to be tested. The rules may be generated in response to user (e.g., tester) inputs. For example, a tester may select a rule name (e.g. "Rule 1") for a rule for one of the HTTP requests using a rule-selecting object 955. In the example of FIG. 9, the testing tool 101 provides a drop down menu for the tester to select the rule name; however, in some embodiments, the tester may provide any name by typing the name into the table or otherwise designating a name and associating that name with an HTTP request. The tester may also select criteria (e.g., parameters) for the rule using rule-making objects 945. As shown in FIG. 9, the rule making objects 945 may include a drop down menu for selecting among a list of available options (e.g., parameters, such as "match," "fire," "no fire," etc.). Although parameters, such as "match," "fire," and "no fire" are particularly discussed herein, other parameters may be used in some embodiments. For example, additionally or alternatively, the parameters may include "contains," "does not contain," "starts with," "ends with," and the like.

In some cases, the tester may be aware of a specific value that a variable should be or may desire to test whether a variable has a specific variable. If the tester wants the criteria of the rule to include that a particular variable matches a specific value, the tester may set a rule-making object 945 to "match" and may specify the specific value. When the rule-making object 945 is set to "match," the testing tool 101 may prompt the user for a specific value (or otherwise provide, activate, or unlock an object, e.g., a field, for the user to enter a specific value) that the variable is to match in order to pass the test. In some embodiments, selecting "match" may cause a pop-up window to appear or another field in proximity to the variable for the tester to enter the specific value.

In some cases, the criteria of a rule may include requiring that a particular variable fires. The tester might not be concerned with the specific value of a variable of an HTTP request, but may want to check that the variable has some value. For example, when a form on a webpage includes a name field for a visitor to enter his/her name, the tester may not be concerned what name is entered as long as the HTTP request transmitted when the form is submitted includes a value in the name field when a visitor enters such a value. To implement such criteria, the tester may set a rule-making object 945 to "fire" for a particular variable. When criteria for a variable is set to "fire" and a rule with such criteria is applied to an HTTP request, the HTTP request should only pass if the variable in the HTTP request has a value.

In some cases, the criteria of a rule may include requiring that a particular variable does not fire. The tester might not be concerned with the specific value of a variable of an HTTP request, but may want to confirm that the variable does not have a value at all. For example, when a webpage includes an option for a visitor to choose to see automotive insurance information or home insurance information, the tester may want to check that a variable related to the home insurance information does not have a value when a visitor requests to see automotive insurance information. To implement such criteria, the tester may set a rule-making object 945 to "No fire" for a particular variable. When criteria for a variable is set to "No fire" and a rule with such criteria is applied to an HTTP request, the HTTP request should only pass if the variable in the HTTP request does not have a value.

For any particular rule, the tester may involve any number of variables. All variables may be involved in a rule, but that is not required. As a default, the testing tool 101 may set the criteria so that each variable is not involved, so that the tester only has to set the criteria for the variables he/she would like to involve in the rule. Moreover, the tester may set different criteria for different variables. For example, a rule may include that a first variable matches a specific value, a second variable fires, and a third variable does not fire.

In step 810, the tester may create a rule for each HTTP request. Different HTTP requests may have the same or a different rule applied to it. For example, if there are three HTTP requests to be tested, the tester may generate "Rule 1" for the first request, generate "Rule 2" for the second request, and set the third request to "Rule 1." In this example, the tester would not have to specify the criteria for the third request again since the testing tool 101 would associate the criteria for "Rule 1." If two rules have the same name, they may have the same criteria. If changes are made to a rule for one HTTP request, those changes may affect other HTTP requests associated with a rule with the same name. Further, in some embodiments, whichever HTTP request is selected (e.g., highlighted) within the table in the third pane 950, the criteria for the rule to be applied to that request may be reflected in the second pane 940. Therefore, testers may review the criteria for the different rules by selecting the different HTTP requests (or rows) in the table.

In some embodiments, the tester may import a previous rule at step 811. Rules may be stored in a database on a web server 210, local network server 220, or other computing device 100. The testing tool 101 may provide access to other rules and import (e.g., download) them so that they may be associated with the HTTP requests to be tested. For example, once imported, the rule-selecting object 955 may allow the tester to choose the imported rule. Accordingly, the tester may avoid having to specify criteria for a rule previously generated and may quickly apply rules to HTTP requests.

Also, in cases where the tester has chosen a previously created test at step 806, the testing tool 101 may assign previously generated rules to each of the HTTP requests. For example, if the tester has previously tested a series of HTTP requests resulting from a set of actions and wants to retest a series of newer HTTP requests resulting from the same set of actions to ensure that the newer HTTP are the same, the tester may select the name of the previous test used thereby triggering the testing tool 101 to assign rules to the HTTP requests as they were previously applied. Accordingly, the tester may avoid having to regenerate rules for a test previously created and may quickly test HTTP requests.

In step 812, the table in the second pane 950 may be updated. As criteria for variables are set, the corresponding variables may be added to the table. Specifically, a column may be added for each variable that is involved in the rule for that request. And, if there is a value for that variable for a request, the value may appear in the appropriate column and row of the table. On the other hand, a tester may modify rules so that they no longer involve variables, and thus, the variables and their values may be removed from the table.

In step 813, the testing tool 101 may execute a test. Referring to FIG. 9, the test may be executed by the testing tool 101 when a test option 960 (e.g., test button) is selected. In other words, the testing tool 101 may automatically apply the designated rules to their associated HTTP request. Collectively, the rules to be applied to the HTTP requests to be tested form a test. Different HTTP requests may have the same or a different rule. Thus, a test may include one or more rules. Further, the testing tool 101 may simultaneously (or approximately at the same time) apply different rules to different HTTP requests. For example, the testing tool may apply a first rule called "Rule 1" to a first and third HTTP requests, and apply a second rule called "Rule 2" to a second HTTP request.

As a result of executing the test, the testing tool 101 may indicate whether each HTTP request has passed or failed its corresponding test at step 814. For example, the testing tool 101 may indicate a "pass" or "fail" in the table for each HTTP request. Step 814 may include generating a column for the results of the test or populating an already existing column in the table. Step 814 may be performed in a similar manner as step 611 described above.

Further, in some embodiments, step 814 may include generating a report. The report may include a summary of how many of the HTTP requests passed and reasons why (e.g., failed criteria) certain rules were not passed. Such a report may be exported and/or saved for later review. Also, the testing tool 101 may include a communication component that may allow the report to be emailed or otherwise distributed to others.

Steps 815 and 816 may be performed in a similar manner as steps 309 and 310, respectively. Also, the third user interface 900 may include options (e.g., buttons) for selecting the export location and triggering the export of the table and/or a report summarizing results of the test.

As described above, FIGS. 5, 7, and 9 illustrate various user interfaces of the testing tool 101. Some versions of the testing tool 101 may provide all three of these interfaces, while some versions might only include one or two of them. Also, the testing tool 101 may include other user interfaces, such as user interfaces for changing viewing preferences (e.g., re-arranging the layout of panes, font size, etc.), capturing HTTP requests, and viewing reports. The testing tool 101 may allow a user (e.g., tester) to access and switch between any of the user interfaces at any time. For example, the testing tool may include tabs for the tester to quickly switch between the user interfaces disclosed herein. It should be understood that the user interfaces of FIGS. 5, 7, and 9 are designed to illustrate various features and aspects of the user interfaces and the testing tool 101, and do not limit the visual appearance or layout of the user interfaces.

The testing tool 101 may also implement other features. For example, the testing tool 101 may track performance of various testers. Testers may be required or asked to log-in before or during use of the testing tool 101, so that the testing tool may track who is doing the testing. The testing tool 101 may, for example, track the number of tests a tester has performed, the number of errors a tester has found, a percentage of tests passed, etc. The testing tool 101 may also have a gaming component. That is, the testing tool 101 may support gamification of the testing process. Thus, testers may compete for who can find the most errors or produce the most accurate test results. For example, testers may be given a series of HTTP requests to test, and the testing tool 101 may track which tester found which errors. The testing tool 101 may provide a user interface with a scoreboard showing the ranking of different testers. In addition, the testing tool 101 may assign rewards (e.g., points, money, gifts, etc.) to testers based on their performance, and keep track of such rewards.

It should be understood that the testing tool 101 may be implemented in various forms. For example, the testing tool 101 may be implemented as an application running on a desktop or laptop computer (e.g., a Windows application), a mobile application (e.g., an application suited to run on a smartphone), or a web application. Where the testing tool 101 is implemented as a web application, it may be supported by a web portal provided by a server such as the web server 210. As a web application, the testing tool 101 may function to directly monitor and/or pull in HTTP requests. Also, implementing the testing tool 101 as a web application may increase access to the testing tool 101.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention. Further, one of ordinary skill in the art will appreciate that various computing devices may be employed to carry out the steps described herein. For example, one computing device may be used to capture HTTP requests, while another computing device may be used to test them. Also, for example, one of ordinary skill in the art will appreciate that the tables disclosed herein may be modified so that rows are columns and columns are rows.

What is claimed is:

1. A method, comprising:
   capturing, by a computing device, one or more requests transmitted based on a selection to load a webpage or a selection of an element on the webpage;
   displaying the one or more requests in a first pane within a user interface on a display;

parsing the one or more requests to identify a plurality of variables of the one or more requests;

displaying, in a second pane within the user interface on the display, a list of the plurality of variables;

receiving a selection of one or more variables from the list of the plurality of variables displayed in the second pane;

updating the second pane to indicate the selection of the one or more variables from the list of the plurality of variables;

displaying a table in a third pane within the user interface on the display, wherein the table comprises one or more rows and one or more columns, each row of the one or more rows corresponds to a corresponding request of the one or more requests, and each column of the one or more columns corresponds to a corresponding variable of the selected one or more variables, wherein while the one or more requests are being displayed in the first pane within the user interface on the display, the list is being displayed in the second pane within the user interface on the display and the table is being displayed in the third pane within the user interface on the display;

receiving a selection of an additional variable from the list of the plurality of variables displayed in the second pane;

updating the second pane to indicate the selection of the additional variable from the list of the plurality of variables; and updating the third pane by adding an additional column corresponding to the additional variable.

2. The method of claim 1, further comprising:
receiving a deselection of a variable from the selected one or more variables;
updating the second pane to indicate the deselection of the variable; and
updating the third pane by removing, from the one or more columns of the table, a column corresponding to the deselected variable.

3. The method of claim 1, wherein each request of the one or more requests comprises a HyperText Transfer Protocol (HTTP) request or a HyperText Transfer Protocol Secure (HTTPS) request.

4. The method of claim 1, wherein the parsing comprises one or more of:
identifying each of the one or more requests;
determining a quantity of the one or more requests; or
separating the one or more requests by storing the one or more requests into one or more different arrays.

5. The method of claim 1, wherein each row of the one or more rows of the table comprises values of the selected one or more variables of a corresponding request of the one or more requests.

6. The method of claim 1, further comprising:
exporting the table for use with an application.

7. A non-transitory computer-readable storage medium having computer-executable program instructions stored thereon that when executed by a processor, cause the processor to perform steps comprising:
capturing one or more requests transmitted based on a selection to load a webpage or a selection of an element on the webpage;
displaying the one or more requests in a first pane within a user interface on a display;
parsing the one or more requests to identify a plurality of variables of the one or more requests;

displaying, in a second pane within the user interface on the display, a list of the plurality of variables;

receiving a selection of one or more variables from the list of the plurality of variables displayed in the second pane;

updating the second pane to indicate the selection of the one or more variables from the list of the plurality of variables;

displaying a table in a third pane within the user interface on the display, wherein the table comprises one or more rows and one or more columns, each row of the one or more rows corresponds to a corresponding request of the one or more requests, and each column of the one or more columns corresponds to a corresponding variable of the selected one or more variables, wherein while the one or more requests are being displayed in the first pane within the user interface on the display, the list is being displayed in the second pane within the user interface on the display and the table is being displayed in the third pane within the user interface on the display;

receiving a selection of an additional variable from the list of the plurality of variables displayed in the second pane;

updating the second pane to indicate the selection of the additional variable from the list of the plurality of variables; and updating the third pane by adding an additional column corresponding to the additional variable.

8. The computer-readable storage medium of claim 7, wherein the computer-executable program instructions, when executed by the processor, further cause the processor to perform:
receiving a deselection of a variable from the selected one or more variables;
updating the second pane to indicate the deselection of the variable; and
updating the third pane by removing, from the one or more columns of the table, a column corresponding to the deselected variable.

9. The computer-readable storage medium of claim 7, wherein each request of the one or more requests comprises a HyperText Transfer Protocol (HTTP) request or a HyperText Transfer Protocol Secure (HTTPS) request.

10. The computer-readable storage medium of claim 7, wherein the computer-executable program instructions, when executed by the processor, further cause the processor to perform the parsing by one or more of:
identifying each of the one or more requests;
determining a quantity of the one or more requests; or
separating the one or more requests by storing the one or more requests into one or more different arrays.

11. The computer-readable storage medium of claim 7, wherein each row of the one or more rows of the table comprises values of the selected one or more variables of a corresponding request of the one or more requests.

12. The computer-readable storage medium of claim 7, wherein the computer-executable program instructions, when executed by the processor, further cause the processor to perform:
exporting the table for use with an application.

13. An apparatus comprising:
a processor; and
a memory configured to store computer-readable instructions that, when executed by the processor, cause the apparatus to perform:

capturing one or more requests transmitted based on a selection to load a webpage or a selection of an element on the webpage;

displaying the one or more requests in a first pane within a user interface on a display;

parsing the one or more requests to identify a plurality of variables of the one or more requests;

displaying, in a second pane within the user interface on the display, a list of the plurality of variables;

receiving a selection of one or more variables from the list of the plurality of variables displayed in the second pane;

updating the second pane to indicate the selection of the one or more variables from the list of the plurality of variables;

displaying a table in a third pane within the user interface on the display, wherein the table comprises one or more rows and one or more columns, each row of the one or more rows corresponds to a corresponding request of the one or more requests, and each column of the one or more columns corresponds to a corresponding variable of the selected one or more variables, wherein while the one or more requests are being displayed in the first pane within the user interface on the display, the list is being displayed in the second pane within the user interface on the display and the table is being displayed in the third pane within the user interface on the display;

receiving a selection of an additional variable from the list of the plurality of variables displayed in the second pane;

updating the second pane to indicate the selection of the additional variable from the list of the plurality of variables; and updating the third pane by adding an additional column corresponding to the additional variable.

14. The apparatus of claim 13, wherein the computer-readable instructions, when executed by the processor, further cause the apparatus to perform:

receiving a deselection of a variable from the selected one or more variables;

updating the second pane to indicate the deselection of the variable; and updating the third pane by removing, from the one or more columns of the table, a column corresponding to the deselected variable.

15. The apparatus of claim 13, wherein each request of the one or more requests comprises a HyperText Transfer Protocol (HTTP) request or a HyperText Transfer Protocol Secure (HTTPS) request.

16. The apparatus of claim 13, wherein the computer-readable instructions, when executed by the processor, cause the apparatus to perform the parsing by one or more of:

identifying each of the one or more requests;

determining a quantity of the one or more requests; or separating the one or more requests by storing the one or more requests into one or more different arrays.

17. The apparatus of claim 13, wherein each row of the one or more rows of the table comprises values of the selected one or more variables of a corresponding request of the one or more requests.

* * * * *